United States Patent
Gunji et al.

(10) Patent No.: US 10,749,175 B2
(45) Date of Patent: Aug. 18, 2020

(54) POSITIVE-ELECTRODE MATERIAL FOR LITHIUM ION SECONDARY BATTERY, METHOD FOR PRODUCING THE SAME, AND LITHIUM ION SECONDARY BATTERY

(71) Applicant: HITACHI METALS, LTD., Tokyo (JP)

(72) Inventors: Akira Gunji, Tokyo (JP); Hisato Tokoro, Tokyo (JP); Shin Takahashi, Tokyo (JP); Tatsuya Toyama, Tokyo (JP); Hiroshi Haruna, Tokyo (JP); Daiko Takamatsu, Tokyo (JP); Takashi Nakabayashi, Tokyo (JP); Shuichi Takano, Tokyo (JP)

(73) Assignee: HITACHI METALS, LTD., Tokyo (JP)

(*) Notice: Subject to any disclaimer, the term of this patent is extended or adjusted under 35 U.S.C. 154(b) by 0 days.

(21) Appl. No.: 16/280,421

(22) Filed: Feb. 20, 2019

(65) Prior Publication Data
US 2019/0181444 A1    Jun. 13, 2019

Related U.S. Application Data

(62) Division of application No. 15/540,730, filed as application No. PCT/JP2016/083167 on Nov. 9, 2016, now Pat. No. 10,256,466.

(30) Foreign Application Priority Data

Nov. 13, 2015  (JP) ................................. 2015-223297
May 25, 2016  (JP) ................................. 2016-104631

(51) Int. Cl.
*H01M 4/1391* (2010.01)
*H01M 4/505* (2010.01)
(Continued)

(52) U.S. Cl.
CPC ............ *H01M 4/505* (2013.01); *C01G 51/50* (2013.01); *C01G 53/00* (2013.01); *H01M 4/131* (2013.01);
(Continued)

(58) Field of Classification Search
CPC .. H01M 4/505; H01M 10/0525; H01M 4/366; H01M 4/62; H01M 4/525;
(Continued)

(56) References Cited

U.S. PATENT DOCUMENTS

| 2011/0033749 A1 | 2/2011 | Uchida et al. |
| 2012/0001132 A1* | 1/2012 | Sengupta ............... C01G 51/50 252/520.21 |

(Continued)

FOREIGN PATENT DOCUMENTS

| CN | 1893151 A | 1/2007 |
| CN | 102509784 A | 6/2012 |

(Continued)

OTHER PUBLICATIONS

Kim, J., et al., "Comparative study of Li (Li1/3Ti5/3) O4 and Li (Ni1/2~xLi2x/3Tix/3) Ti3/2O4 (x=1/3) anodes for Li rechargeable batteries," Electrochimica Acta, May 21, 2009, vol. 54, pp. 5914-5918.

(Continued)

*Primary Examiner* — Cynthia K Walls
(74) *Attorney, Agent, or Firm* — Volpe and Koenig, P.C.

(57) ABSTRACT

A positive-electrode material for a lithium ion secondary battery contains a lithium complex compound that is represented by the formula: $Li_{1+a}Ni_bMn_cCo_dTi_eM_fO_{2+\alpha}$, and has an atomic ratio $Ti^{3+}/Ti^{4+}$ between $Ti^{3+}$ and $Ti^{4+}$, as determined through X-ray photoelectron spectroscopy, of greater than or equal to 1.5 and less than or equal to 20. In the formula, M is at least one element selected from the group (Continued)

consisting of Mg, Al, Zr, Mo, and Nb, and a, b, c, d, e, f, and $\alpha$ are numbers satisfying $-0.1 \leq a \leq 0.2$, $0.7 < b \leq 0.9$, $0 \leq c < 0.3$, $0 \leq d < 0.3$, $0 < e \leq 0.25$, $0 \leq f < 0.3$, $b+c+d+e+f=1$, and $-0.2 \leq \alpha \leq 0.2$.

3 Claims, 24 Drawing Sheets

(51) Int. Cl.
  *C01G 53/00* (2006.01)
  *H01M 4/131* (2010.01)
  *H01M 4/525* (2010.01)
  *H01M 4/62* (2006.01)
  *C01G 51/00* (2006.01)
  *H01M 4/36* (2006.01)
  *H01M 10/0525* (2010.01)
  *H01M 4/02* (2006.01)

(52) U.S. Cl.
  CPC ......... *H01M 4/1391* (2013.01); *H01M 4/366* (2013.01); *H01M 4/525* (2013.01); *H01M 4/62* (2013.01); *H01M 10/0525* (2013.01); *C01P 2002/50* (2013.01); *C01P 2002/72* (2013.01); *C01P 2004/02* (2013.01); *C01P 2006/12* (2013.01); *C01P 2006/40* (2013.01); *H01M 2004/028* (2013.01)

(58) Field of Classification Search
  CPC ............... H01M 4/1391; H01M 4/131; H01M 2004/028; C01G 51/50; C01G 53/00; C01P 2004/02; C01P 2006/12; C01P 2002/72; C01P 2002/50; C01P 2006/40
  See application file for complete search history.

(56) References Cited

U.S. PATENT DOCUMENTS

| | | |
|---|---|---|
| 2012/0321956 A1 | 12/2012 | Kawahashi et al. |
| 2013/0189581 A1 | 7/2013 | Imaizumi et al. |
| 2015/0056502 A1 | 2/2015 | Haruna et al. |
| 2015/0079471 A1 | 3/2015 | Fang et al. |
| 2016/0156020 A1 | 6/2016 | Tokoro et al. |

FOREIGN PATENT DOCUMENTS

| | | |
|---|---|---|
| CN | 103441255 A | 12/2013 |
| EP | 2 879 213 A1 | 6/2015 |
| JP | 2003-331824 A | 11/2003 |
| JP | 2006-107818 A | 4/2006 |
| JP | 2011-154928 A | 8/2011 |
| JP | 4807467 B1 | 11/2011 |
| KR | 2012-0136381 A | 12/2012 |
| KR | 2015-0022647 A | 3/2015 |
| WO | 2009/057722 A1 | 5/2009 |
| WO | 2015/047023 A1 | 4/2015 |

OTHER PUBLICATIONS

Kam et al., "Aliovalent titanium substitution in layered mixed Li Ni—Mn—Co oxides for lithium battery applications," Journal of Materials Chemistry, pp. 9991-9993 (Jan. 21, 2011).

Deng et al., "Influence of Cationic Substitutions on the Oxygen Loss and Reversible Capacity of Lithium-Rich Layered Oxide Cathodes," The Journal of Physical Chemistry, pp. 7097-7103 (Mar. 17, 2011).

Capsoni, D., et al, "Cr and Ni Doping of Li4Ti5O12: Cation Distribution and Functional Properties," Journal of Physical Chemistry C, Oct. 16, 2009, vol. 113, pp. 19664-19671.

Korean Office Action dated May 28, 2018 for the Korean Patent Application No. 10-2017-7017913.

Extended European Search Report dated Jun. 6, 2018 for the European Patent Application No. 16864229.6.

Japanese Office Action dated May 15, 2018 for the Japanese Patent Application No. 2017-133462.

Chinese Office Action dated Aug. 29, 2019 for the Chinese Patent Application No. 201680004750.3.

\* cited by examiner

POSITIVE-ELECTRODE MATERIAL FOR LITHIUM ION SECONDARY BATTERY, METHOD FOR PRODUCING THE SAME, AND LITHIUM ION SECONDARY BATTERY

TECHNICAL FIELD

The present invention relates to a positive-electrode material used for a positive electrode of a lithium ion secondary battery, a method for producing the positive-electrode material, and a lithium ion secondary battery that uses the positive-electrode material.

BACKGROUND ART

Lithium ion secondary batteries are in widespread use as compact, lightweight secondary batteries with high energy density. For lithium ion secondary batteries, for example, lithium metal, lithium alloy, metal oxide, carbon, or the like is used as a negative-electrode material, while lithium-metal composite oxide with a layered structure is used as a positive-electrode material. As an example of such a positive-electrode material, there is disclosed a positive-electrode active material that exhibits high thermal stability when used for a positive electrode of a nonaqueous-electrolyte secondary battery, and has a high charge-discharge capacity (see Patent Literature 1 below).

The positive-electrode active material for a nonaqueous-electrolyte secondary battery described in Patent Literature 1 contains a powder of lithium-metal composite oxide represented by the general formula: $LiNi_xM_{1-x}O_2$ (x in the formula satisfies $(4-Z)\times x \geq 0.75$, where Z is the average valence of Ni, and M in the formula represents at least one element whose average valence in the entire M is greater than or equal to 3). When a nonaqueous-electrolyte secondary battery that uses such a powder as a positive-electrode active material is charged up to a composition of $Li_{0.25}Ni_xM_{1-x}O_2$, the number of moles of quadrivalent Ni becomes less than or equal to 60% of the total number of moles of Ni and M.

According to Patent Literature 1, using the aforementioned positive-electrode active material can prevent a decrease in the initial capacity of the battery that would occur due to substitution of Ni with another element, and can, when the material is used for a positive electrode of a lithium ion battery, improve the thermal stability of the battery as long as the material satisfies the following conditions: the number of moles of quadrivalent Ni, which is thermally unstable, becomes less than or equal to 60% of the total number of moles of Ni and the added element M when the battery is charged up to a composition of $Li_{0.25}Ni_xM_{1-x}O_2$ that indicates the fully charged state.

There is also disclosed a method for producing surface-modified lithium-containing composite oxide that contains lithium-containing composite oxide particles and lithium-titanium composite oxide represented by the general formula: $Li_pN_xM_yO_zF_a$ on the surface layers of the particles (see Patent Literature 2 below). In the general formula, N is at least one element selected from the group consisting of Co, Mn, and Ni, and M is at least one element selected from the group consisting of a transition metal element other than Co, Mn, and Ni; Al; Sn; and an alkaline-earth metal element, and satisfies $0.9 \leq p \leq 1.3$, $0.9 \leq x \leq 2.0$, $0 \leq y \leq 0.1$, $1.9 \leq z \leq 4.2$, and $0 \leq a \leq 0.05$.

In the production method in accordance with the invention described in Patent Literature 2, a powder of lithium-containing composite oxide is first impregnated with a solution containing a lithium source and a titanium source dissolved therein. Then, heat treatment at 400 to 1000° C. is applied to the obtained lithium titanium-impregnated particles. The invention described in Patent Literature 2 is characterized in that the titanium content in the surface layer of the surface-modified lithium-containing composite oxide, which is obtained through the heat treatment, is 0.01 to 1.95 mol % relative to the lithium-containing composite oxide that is the base material. Accordingly, in Patent Literature 2, a method for producing surface-modified lithium-containing composite oxide is provided that can be advantageously used for a positive electrode of a lithium ion secondary battery, has a high discharge capacity and volume capacity density, is highly safe, and has excellent charge-discharge cycle durability, rate characteristics, and low production cost.

CITATION LIST

Patent Literature

Patent Literature 1: JP 2006-107818 A
Patent Literature 2: WO 2009/057722 A

SUMMARY OF INVENTION

Technical Problem

According to the positive-electrode material described in Patent Literature 1, deterioration of the lithium ion secondary battery along with the charge-discharge cycles can be suppressed by substituting Ni with another element. However, there is a problem in that as the amount of Ni that contributes to charge-discharge reactions decreases, it is difficult to increase the capacity.

In the positive-electrode material described in Patent Literature 2, the surfaces of the lithium-containing composite oxide particle are each modified with a surface layer containing lithium-titanium composite oxide, so that the charge-discharge cycle durability is improved. However, as the surface layer having a different crystal structure from that of the positive-electrode material inhibits insertion and desorption of lithium ions, there is a possibility that the resistance during charging and discharging may increase. In addition, there is also a possibility that if an excessive amount of titanium is added, the amount of Ni that contributes to charge-discharge reactions may decrease, which in turn may decrease the charge-discharge capacity. Further, if the surface is excessively modified with lithium-titanium composite oxide, the amount of lithium that can be inserted or desorbed may decrease, which in turn may decrease the charge-discharge capacity.

The present invention has been made in view of the foregoing problems. It is an object of the present invention to provide a positive-electrode material for a lithium ion secondary battery that has a higher charge-discharge capacity than those of the conventional lithium ion secondary batteries and also has a suppressed resistance increase rate and excellent cycle characteristics; a method for producing the positive-electrode material; and a lithium ion secondary battery that has excellent low-temperature output characteristics.

Solution to Problem

In order to achieve the aforementioned object, a positive-electrode material for a lithium ion secondary battery of the present invention contains a lithium complex compound represented by the following Formula (1) and having an atomic ratio $Ti^{3+}/Ti^{4+}$ between $Ti^{3+}$ and $Ti^{4+}$, as determined through X-ray photoelectron spectroscopy, of greater than or equal to 1.5 and less than or equal to 20.

$$Li_{1+a}Ni_bMn_cCo_dTi_eM_fO_{2+\alpha} \qquad (1)$$

It should be noted that in Formula (1) above, M is at least one element selected from the group consisting of Mg, Al, Zr, Mo, and Nb, and a, b, c, d, e, f, and α are numbers satisfying −0.1≤a≤0.2, 0.7<b≤0.9, 0≤c<0.3, 0≤d<0.3, 0<e≤0.25, 0≤f<0.3, b+c+d+e+f=1, and −0.2≤α≤0.2.

Advantageous Effects of Invention

The present invention can provide a positive-electrode material for a lithium ion secondary battery that has a higher charge-discharge capacity than those of the conventional lithium ion secondary batteries and also has a suppressed resistance increase rate and excellent cycle characteristics; a method for producing the positive-electrode material; and a lithium ion secondary battery that has excellent low-temperature output characteristics.

DESCRIPTION OF EMBODIMENTS

Figure 1A:
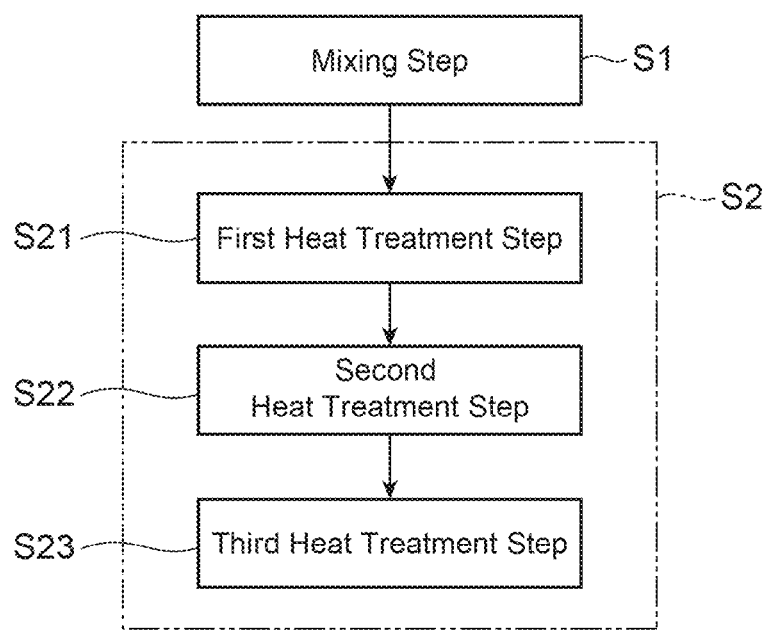
FIG. 1A is a flowchart illustrating each step of a method for producing a positive-electrode material in accordance with an embodiment of the present invention.

Hereinafter, embodiments of a positive-electrode material for a lithium secondary battery and a method for producing the positive-electrode material of the present invention will be described in detail.
(Positive-Electrode Material for Lithium Secondary Battery)

A positive-electrode material in this embodiment is, for example, a powder-form positive-electrode active material used for a positive electrode of a lithium ion secondary battery described below. The positive-electrode material in this embodiment contains a lithium complex compound represented by the following Formula (1) and having an atomic ratio ($Ti^{3+}/Ti^{4+}$) between trivalent titanium Ti ($Ti^{3+}$) and quadrivalent titanium ($Ti^{4+}$), as determined on the basis of X-ray photoelectron spectroscopy (XPS), of greater than or equal to 1.5 and less than or equal to 20.

$$Li_{1+a}Ni_bMn_cCo_dTi_eM_fO_{2+\alpha} \qquad (1)$$

It should be noted that in Formula (1) above, M is at least one element selected from the group consisting of Mg, Al, Zr, Mo, and Nb, where a, b, c, d, e, f, and α are numbers satisfying −0.1≤a≤0.2, 0.7<b≤0.9, 0≤c<0.3, 0≤d<0.3, 0<e≤0.25, 0≤f<0.3, b+c+d+e+f=1, and −0.2≤α≤0.2. Hereinafter, the defined range of a, b, c, d, e, f and α will be described in detail.

In Formula (1) above, a indicates the stoichiometric ratio of the positive-electrode material represented by the chemical formula: $LiM'O_2$, that is, the amount of excess or deficiency of Li compared to Li:M':O=1:1:2. Herein, M' indicates a metal element other than Li in Formula (1). As the Li content is higher, the valence of the transition metal before the battery is charged becomes higher. Thus, the rate of change in the valence of the transition metal upon desorption of Li is reduced, and the charge-discharge cycle characteristics of the positive-electrode material can thus be improved. To the contrary, as the Li content is higher, the charge-discharge capacity of the positive-electrode material will be decrease. Meanwhile, if the Li content is significantly lower than the stoichiometric ratio, the charge-discharge capacity will decrease with a decrease in the Li content. Thus, setting a, which represents the amount of excess or deficiency of Li in Formula (1) above, in the range of −0.1 to 0.2 can improve the charge-discharge cycle characteristics of the material and suppress a reduction in the charge-discharge capacity.

More preferably, a, which represents the amount of excess or deficiency of Li in Formula (1) above, can be set in the range of −0.05 to 0.1, or more preferably, in the range of 0 to 0.06. When a in Formula (1) above is greater than or equal to −0.05, or more preferably, greater than or equal to 0 and less than or equal to 0.06, a sufficient amount of Li that can contribute to charging and discharging is secured, and the capacity of the positive-electrode material can thus be increased. In addition, when a in Formula (1) above is less than or equal to 0.1, charge compensation along with a change in the valence of the transition metal can be sufficiently secured, and thus, both a high capacity and high charge-discharge cycle characteristics can be achieved.

When b, which indicates the Ni content in Formula (1) above, is over 0.7, a sufficient amount of Ni that can contribute to charging and discharging can be secured in the positive-electrode material, which is advantageous for increasing the capacity. Meanwhile, if b in Formula (1) above is over 0.9, there is a possibility that Ni may be partially substituted with a Li site, and thus, a sufficient amount of Li that can contribute to charging and discharging may not be secured, and the charge-discharge capacity of the positive-electrode material may decrease. Therefore, setting b, which indicates the Ni content in Formula (1) above, to greater than 0.7 and less than or equal to 0.9, or preferably in the range of 0.75 to 0.85 can increase the capacity of the positive-electrode material and suppress a decrease in the charge-discharge capacity.

In addition, adding Mn has a function of stably maintaining the layered structure even when desorption of Li occurs due to charging. However, if c, which indicates the Mn content in Formula (1) above, is greater than or equal to 0.3, the capacity of the positive-electrode material will decrease. Therefore, setting c in Formula (1) above to greater than or equal to 0 and less than 0.3 can stably maintain the layered structure of the lithium complex compound that forms the positive-electrode material even when insertion or desorption of Li occurs due to charging or discharging, and thus can suppress a decrease in the capacity of the positive-electrode material.

The range of d, which indicates the Co content in Formula (1) above, is preferably greater than or equal to 0 and less than 0.3. If d is greater than or equal to 0.3, the supply amount will be limited, and the proportion of Co, which is costly, will be relatively high, which is disadvantageous in the industrial production of the positive-electrode material.

The range of e, which indicates the Ti content in Formula (1) above, is greater than 0 and less than or equal to 0.25, or more preferably, greater than or equal to 0.001 and less than or equal to 0.15. From a perspective of surely obtaining the advantageous effect of adding Ti, e is further preferably greater than or equal to 0.005 and less than or equal to 0.15. From a perspective of suppressing an increase in the material cost and improving the sintering property of the positive-electrode material, e is further preferably greater than or equal to 0.001 and less than or equal to 0.05.

Although Li and Ti can form a variety of Li—Ti—O compounds, Ti is most stable when it is quadrivalent ($Ti^{4+}$) and is likely to form a compound such as $Li_2TiO_3$ or $Li_4Ti_5O_{12}$. If e is over 0.25, such Li—Ti—O compound is likely to be generated as a different phase, and the resistance thus becomes high. Further, as the cost is increased, such a compound is not preferable as an industrial material.

In addition, the ratio a/e between a, which indicates the amount of excess of Li, and e, which indicates the Ti content, in Formula (1) above is preferably less than or equal to 5 (a/e≤5). When the value of a/e is less than or equal to 5, generation of a different phase like a Li—Ti—O compound during the stage of synthesizing a lithium complex compound can be suppressed, and the strength of the particles can thus be improved. Consequently, a decrease in the capacity and an increase in the resistance along with the charge-discharge cycles can be suppressed.

Further, when M in Formula (1) above is at least one metal element selected from the group consisting of Mg, Al, Zr, Mo, and Nb, electrochemical activity of the positive-electrode material can be secured. In addition, when a metal site of the lithium complex compound that forms the positive-electrode material is substituted with such metal element, the stability of the crystal structure of the lithium complex compound as well as the electrochemical characteristics (e.g., cycle characteristics) of the layered positive-electrode active material can be improved. It should be noted that if f, which indicates the M content in Formula (1) above, is excessive, the capacity of the positive-electrode material will decrease. Therefore, when b, c, d, e, and f in Formula (1) above satisfy b+c+d+e+f=1, a decrease in the capacity of the positive-electrode material can be suppressed.

a in Formula (1) above indicates the range that permits a layer-structured compound included in the space group R-3 m, and indicates the amount of excess or deficiency of oxygen. From a perspective of maintaining an $\alpha$-$NaFeO_2$-type layered structure of the lithium complex compound that forms the positive-electrode material, a may be in the range of −0.2 to 0.2, for example. However, when a in Formula (1) above is in the range of −0.1 to 0.1, the layered structure of the lithium complex compound that forms the positive-electrode material can be maintained more surely.

It should be noted that the particles of the lithium complex compound that forms the positive-electrode material, which is the powder-form positive-electrode active material, may be primary particles in which individual particles are separate from one another. However, the particles are desirably secondary particles obtained by binding a plurality of primary particles together through sintering or the like. The primary particles or secondary particles may also contain an unavoidable free lithium compound.

The average particle size of the primary particles of the positive-electrode material is preferably greater than or equal to 0.1 μm and less than or equal to 2 μm, for example. When the average particle size of the primary particles of the positive-electrode material is less than or equal to 2 μm, a reaction site of the positive-electrode material can be secured, and a high capacity and low resistance are obtained. In addition, the average particle size of the secondary particles of the positive-electrode material is preferably greater than or equal to 3 μm and less than or equal to 50 μm, for example.

The particles of the positive-electrode material can be formed as secondary particles by granulating primary particles, which have been produced with a positive-electrode material production method described below, through dry granulation or wet granulation. As a means for granulation, granulators such as spray dryers or fluid bed granulators can be used, for example.

The crystal structures of the particles of the positive-electrode material can be confirmed using X-ray diffraction (XRD), for example. In addition, the average composition of the particles of the positive-electrode material can be confirmed using high-frequency inductively coupled plasma (ICP), atomic absorption spectrometry (AAS), or the like. The average particle size of the particles of the positive-electrode material can be measured using a laser diffraction particle size distribution measuring apparatus, for example.

The BET specific surface area of the positive-electrode material is preferably about greater than or equal to 0.2 m²/g and less than or equal to 2.0 m²/g, for example. When the BET specific surface area of the particles of the positive-electrode material is less than or equal to about 2.0 m²/g, the filling property of the positive-electrode material of the positive electrode can be improved, and thus, a positive electrode with high energy density can be produced. Further, as the area in contact with an electrolytic solution does not become excessive, side reactions with the electrolytic solution can be suppressed, and an increase in the resistance can thus be suppressed. More preferably, the BET specific surface area of the positive-electrode material is greater than or equal to 0.5 m²/g and less than or equal to 1.5 m²/g. It should be noted that the BET specific surface area can be measured using an automatic specific surface area measuring apparatus.

Further, the particle fracture strength of the positive-electrode material is preferably greater than or equal to 50 MPa and less than or equal to 200 MPa. Accordingly, the particles of the positive-electrode material will not become damaged during the process of producing an electrode, and thus, coating failures, such as peeling, can be suppressed in forming a positive-electrode mixture layer by coating the surface of a positive-electrode current collector with a slurry containing the positive-electrode material. Further, since cracking of the secondary particles due to expansion or contraction of the positive-electrode material along with charging and discharging can be suppressed, a decrease in the capacity and an increase in the resistance along with the cycles can be suppressed. The particle fracture strength of the positive-electrode material can be measured using a micro compression testing machine, for example.

In addition, the positive-electrode material preferably has a concentrated $Ti^{3+}$ layer on the surface of each secondary particle that is the agglomerated primary particles of the lithium complex compound. It is effective if the concentrated $Ti^{3+}$ layer is provided on a surface, which is in contact with an electrolytic solution, of each secondary particle formed by the agglomerated primary particles, and further, the concentrated $Ti^{3+}$ layer may also be provided inside the secondary particle. The concentrated $Ti^{3+}$ layer is preferably in the form in which a transition metal site in the layered structure of the lithium complex compound included in the space group R-3m is substituted with Ti. Conversely, if the concentrated $Ti^{3+}$ layer has a structure other than the R-3m layered structure, the layer becomes a different phase, which is undesirable as the discharge capacity will decrease. In addition, the surfaces of the secondary particles of the positive-electrode material may be fluorinated.

Hereinafter, the function of the positive-electrode material in this embodiment will be described.

The positive-electrode material in this embodiment contains Ni in the range in which b, which indicates the Ni content in the lithium complex compound represented by Formula (1) above, is greater than 0.7 and less than or equal to 0.9. Ni is contained mainly as trivalent Ni ($Ni^{3+}$) in the lithium complex compound. $Ni^{3+}$ in the lithium complex compound becomes quadrivalent Ni ($Ni^{4+}$) from $Ni^{3+}$ when the lithium ion secondary battery is charged, and undergoes an oxidation-reduction reaction in which Ni returns to $Ni^{3+}$ from $Ni^{4+}$ when the lithium ion secondary battery is discharged, and thus contributes to increasing the charge-discharge capacity of the positive-electrode material. However, $Ni^{3+}$ in the lithium complex compound is likely to become divalent Ni ($Ni^{2+}$), which is stable, when the lithium ion secondary battery is repeatedly charged and discharged over a certain number of times, and thus generates NiO-like cubic crystals by releasing oxygen from the crystals. $Ni^{2+}$ whose valence has changed with a change in the crystal structure does not contribute to charging or discharging of the lithium ion secondary battery any more.

Typically, a positive-electrode material represented by the general formula: $LiNiO_2$ has a problem in that although it has a higher capacity than a positive-electrode material represented by the general formula: $LiCoO_2$, it has lower stability in the crystal structure than that of the positive-electrode material represented by $LiCoO_2$, and thus undergoes significant deterioration along with the charge-discharge cycles. This is because, in the positive-electrode material represented by $LiNiO_2$, some of $Ni^{3+}$ in the transition metal site will easily move as $Ni^{2+}$ to the Li site (cation mixing) as described above, and release oxygen at lower temperatures in the charged state in comparison with the positive-electrode material represented by $LiCoO_2$. In addition, the positive-electrode material represented by $LiNiO_2$ has a possibility that a film of a decomposed matter of the electrolytic solution may be formed on the positive-electrode material due to a reaction between the electrolytic solution and oxygen released from the surfaces of the particles of the positive-electrode material along with the charge-discharge cycles, or a NiO-like different phase may be formed on the surface of the positive-electrode material, which may inhibit the movement of electric charges.

In order to solve the aforementioned problems, the positive-electrode material in this embodiment contains Ti in the range in which e, which indicates the Ti content in the lithium complex compound represented by Formula (1) above, is greater than 0 and less than or equal to 0.25. Ti in the lithium complex compound that forms the positive-electrode material is contained mainly in the state of $Ti^{3+}$ or $Ti^{4+}$. $Ti^{3+}$ in the lithium complex compound can, by becoming more stable $Ti^{4+}$ and thus carrying out charge compensation, cause a change in the valence from $Ni^{3+}$ to $Ni^{2+}$ while maintaining the layered structure of the lithium complex compound, and thus suppress generation of a NiO-like different phase, thereby contributing to suppressing a decrease in the capacity and suppressing an increase in the resistance along with the charge-discharge cycles. That is, as $Ti^{3+}$ is present in large quantities on the surface layer of the positive-electrode material, the aforementioned charge compensation is effectively carried out, and the layered structure is thus stabilized. In addition, generation of a NiO-like different phase on the surface of the positive-electrode material can be suppressed.

The range of e, which indicates the Ti content, is preferably greater than 0 and less than or equal to 0.25, or more preferably, greater than or equal to 0.005 and less than or equal to 0.15. Further preferably, the range of e, which indicates the Ti content, is greater than or equal to 0.005 and less than or equal to 0.05. Such a range can obtain appropriate electrode characteristics without the synthesis conditions greatly changed.

However, as described above, Ti is most stable when it is quadrivalent ($Ti^{4+}$) and is likely to form a compound such as $Li_2TiO_3$ or $Li_4Ti_5O_{12}$. It was found that a different phase like $Li_4Ti_5O_{12}$ herein is generated in the grain boundaries between the primary particles, and this causes a decrease in the strength of the secondary particles. That is, if e is over 0.25, a different phase like $Li_2TiO_3$ is likely to be generated, and consequently, the resistance becomes high.

Meanwhile, it was also found that if the Li content is excessive, the proportion of a different phase like $Li_2TiO_3$ that remains in the grain boundaries becomes high, and this is related to the balance between the Li content and the Ti content. That is, the ratio a/e between a, which indicates the amount of excess of Li, and e, which indicates the Ti content, in Formula (1) above is preferably less than or equal to 5 (a/e≤5). If the value of a/e is over 5, a different phase like a Li—Ti—O compound is likely to be generated during the stage of synthesizing a lithium complex compound, and the strength of the particles will thus decrease. Consequently, a decrease in the capacity and an increase in the resistance are likely to occur along with the cycles.

Further, the positive-electrode material in this embodiment contains a lithium complex compound that is represented by Formula (1) above and has an atomic ratio $Ti^{3+}/Ti^{4+}$ between $Ti^{3+}$ and $Ti^{4+}$, as determined on the basis of X-ray photoelectron spectroscopy (XPS) that is a method of analyzing a surface state, of greater than or equal to 1.5 and less than or equal to 20. The reason why $Ti^{3+}$ is contained in large quantities, specifically, as much as 1.5 to 20 times that of $Ti^{4+}$, which is most stable as Ti, is estimated that Ti has solid-dissolved in the positive-electrode material and $Ti^{3+}$ has thus been stabilized.

Accordingly, when $Ni^{2+}$ is generated in the lithium complex compound along with the charge-discharge cycles of the positive-electrode material, the layered structure of the lithium complex compound can be maintained as long as $Ti^{3+}$ becomes $Ti^{4+}$ and charge compensation is thus carried out. Further, as release of oxygen along with a change in the structure of the positive-electrode material can be suppressed, decomposition reactions of the electrolytic solution along with the charge-discharge cycles can be suppressed. Thus, according to the positive-electrode material in this embodiment, excellent cycle characteristics can be exhibited.

It should be noted that if the atomic ratio $Ti^{3+}/Ti^{4+}$ between $Ti^{3+}$ and $Ti^{4+}$ in the lithium complex compound is less than 1.5, the effect of suppressing a decrease in the charge-discharge capacity of the positive-electrode material, which would occur as $Ni^{3+}$ in the lithium complex compound becomes $Ni^{2+}$, cannot be insufficiently obtained, and thus, it is difficult to obtain a higher charge-discharge capacity than those of the conventional lithium ion secondary batteries. In addition, as a phase with a different crystal structure from that of the positive-electrode material is generated on the surface of the positive-electrode material, the initial resistance will increase, or the bonding strength between the primary particles will weaken, which in turn will decrease the strength of the particles. Meanwhile, if the atomic ratio $Ti^{3+}/Ti^{4+}$ between $Ti^{3+}$ and $Ti^{4+}$ in the lithium complex compound is over 20, there is a possibility that the charge-discharge capacity of the positive-electrode material may decrease along with an excessive growth of the sintered particles in the lithium complex compound.

Further, as the surface of each secondary particle of the positive-electrode material has a concentrated $Ti^{3+}$ layer, the charge-discharge cycle characteristics can be improved. In addition, as the concentrated Ti layer on the surface of each secondary particle of the positive-electrode material can stabilize the layered structure and thus does not inhibit insertion or desorption lithium ions, an increase in the resistance during charging and discharging can be suppressed.

In addition, as the surface (a further front surface of the concentrated $Ti^{3+}$ layer) of each secondary particle of the positive-electrode material is fluorinated, the surface of the particle of the positive-electrode material is modified, and elution of transition metal as well as decomposition of the nonaqueous solvent is suppressed. Accordingly, the cycle characteristics of the secondary battery are improved.

(Method for Producing Positive-Electrode Material for Lithium Secondary Battery)

Figure 1B:
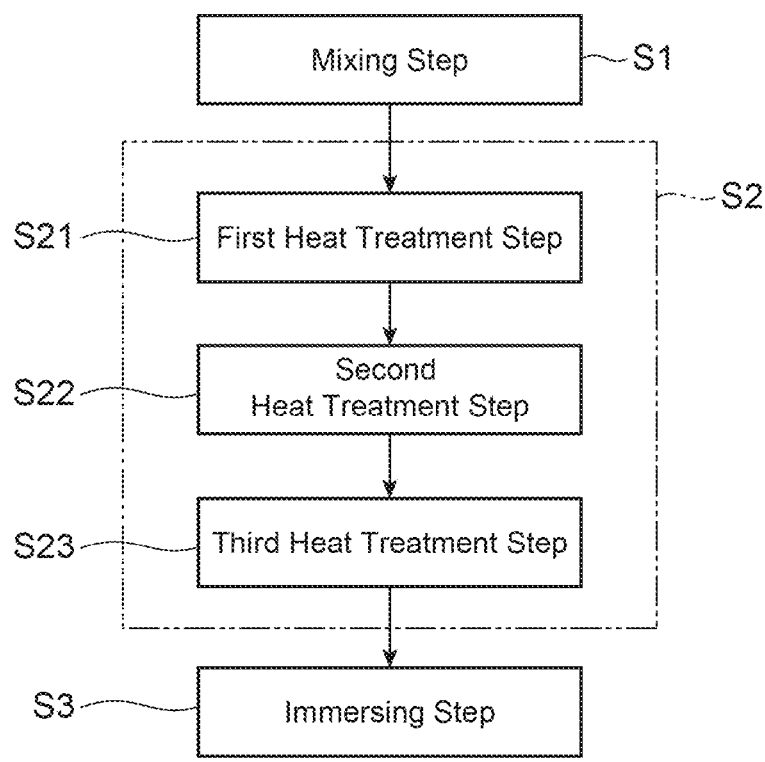
FIG. 1B is a flowchart illustrating each step of a variation of the production method shown in FIG. 1A.

FIG. 1A is a flowchart illustrating each step of a method for producing a positive-electrode material for a lithium secondary battery in this embodiment. The method for producing a positive-electrode material in this embodiment is a method for producing a positive-electrode material that is the aforementioned powder-form positive-electrode active material, and mainly includes a mixing step S1 and a firing step S2. In addition, as shown in FIG. 1B, the method for producing a positive-electrode material in this embodiment may also include an immersing step S3 in addition to the mixing step S1 and the firing step S2.

In the mixing step S1, a mixture is obtained by mixing a lithium-containing compound with compounds each containing a metal element other than Li in Formula (1) above. As the lithium-containing compound, lithium carbonate can be used, for example. Lithium carbonate as a starting material of the positive-electrode material is excellent in industrial applicability and practical utility in comparison with other Li-containing compounds, such as acetic acid lithium, nitric acid lithium, lithium hydroxide, lithium chloride, and sulfuric acid lithium.

As the compounds each containing a metal element other than Li in Formula (1) above, a Ni-containing compound, a Mn-containing compound, a Co-containing compound, a Ti-containing compound, a M-containing compound, and the like can be used, for example. Herein, the M-containing compound is a compound containing at least one metal element selected from the group consisting of Mg, Al, Zr, Mo, and Nb.

As each of the Ni-containing compound, the Mn-containing compound, and the Co-containing compound, oxide, hydroxide, carbonate, sulfate, or acetate can be used, for example. In particular, oxide, hydroxide, or carbonate is preferably used. Meanwhile, as the M-containing compound, acetate, nitrate, carbonate, sulfate, oxide, or hydroxide can be used, for example. In particular, carbonate, oxide, or hydroxide is preferably used.

Further, the Ti-containing compound can be at least one compound selected from the group consisting of oxide, nitride, carbide, and an organic titanium compound, for example, and is preferably Ti oxide or an organic titanium compound, for example. Examples of the organic titanium compound include a Ti-containing coupling agent, a Ti-containing alkoxide, a Ti-containing chelating agent, a Ti-containing acylating agent, and a Ti-containing surfactant. The organic titanium compound can be mixed in a liquid-state in the mixing step S1.

In the mixing step S1, a raw material powder is prepared by mixing the aforementioned starting materials weighed at a ratio to obtain a predetermined composition corresponding to Formula (1) above. In the mixing step S1, the aforementioned starting materials are preferably mixed by being ground with a grinder, for example. Accordingly, a uniformly mixed power-form solid mixture can be prepared. As a grinder for grinding the compound of the aforementioned starting materials, a common precision grinder, such as a ball mill, a jet mill, or a sand mill, can be used.

The starting materials are preferably ground through wet grinding. From an industrial perspective, a solvent used for wet grinding is preferably water. A solid-liquid mixture obtained by grinding the aforementioned starting materials through wet grinding can be dried with a dryer, for example. As the dryer, a spray dryer, a fluidized-bed dryer, or an evaporator can be used, for example.

When a solid material such as oxide is used as the Ti-containing compound in the mixing step S1, dispersibility is likely to be lower than that when a liquid material is used. However, dispersibility can be improved by adjusting the grinding conditions.

In the firing step S2, the mixture obtained in the mixing step S1 is fired under an oxidizing atmosphere to obtain a lithium complex compound that is represented by Formula (1) above and has an atomic ratio $Ti^{3+}/Ti^{4+}$ between $Ti^{3+}$ and $Ti^{4+}$, as determined on the basis of XPS, of greater than or equal to 1.5 and less than or equal to 20. The oxygen concentration in the oxidizing atmosphere in the firing step S2 is preferably greater than or equal to 80% from a perspective of sufficiently promoting a Ni oxidation reaction, and the oxygen concentration is more preferably greater than or equal to 90%, or further preferably greater than or equal to 95%, or even more preferably 100%.

The heat treatment temperature (firing temperature; hereinafter, the same) in the firing step S2 is preferably greater than or equal to 700° C. and less than 900° C. If the heat treatment temperature is less than 700° C., the lithium complex compound cannot be crystallized insufficiently. If the heat treatment temperature is over 900° C., the layered structure of the lithium complex compound will be decomposed and $Ni^{2+}$ will be generated. Thus, the capacity of the obtained positive-electrode material becomes low.

The appropriate value of the heat treatment temperature in the firing step S2 differs depending on the amount of an unreacted Li raw material, and is influenced by the rate of temperature increase and the like. If the amount of an unreacted Li raw material is large, dissolution of the Li raw material will occur, and the particles will be likely to grow due to liquid-phase sintering. Excessive growth of the particles will lead to a decrease in the charge-discharge capacity. Therefore, an appropriate value of the heat treatment temperature will decrease. However, if the heat treatment temperature is low, Ti, which has been added, cannot be efficiently converted into $Ti^{3+}$ in the lithium complex compound, and thus, the charge-discharge capacity and the cycle characteristics of the positive-electrode material will decrease. Thus, the heat treatment temperature in the firing step S2 is preferably greater than or equal to 750° C. and less than or equal to 850° C., for example.

The firing step S2 may include a first heat treatment step S21, a second heat treatment step S22, and a third heat treatment step S23. In the first heat treatment step S21, the mixture obtained in the mixing step S1 is subjected to heat treatment at a heat treatment temperature of greater than or equal to 200° C. and less than or equal to 400° C. for a period of greater than or equal to 0.5 hour and less than or equal to 5 hours, for example, whereby a first precursor is obtained. In the second heat treatment step S22, the first precursor obtained in the first heat treatment step S21 is subjected to heat treatment at a heat treatment temperature of greater than or equal to 450° C. and less than or equal to 720° C. for a period of greater than or equal to 0.5 hour and less than or equal to 50 hours, whereby a second precursor is obtained. Through such heat treatment, the amount of an unreacted Li raw material can be controlled. In the third heat treatment step S23, the second precursor obtained in the second heat treatment step S22 is subjected to heat treatment at a heat treatment temperature of greater than or equal to 700° C. and less than or equal to 900° C. for a period of greater than or equal to 0.5 hour and less than or equal to 50 hours, whereby a lithium complex compound is obtained. The heat treatment temperature in the third heat treatment step S23 is preferably greater than or equal to 750° C. from a perspective of efficiently converting Ti, which has been added, into $Ti^{3+}$ in the lithium complex compound.

According to the method for producing a positive-electrode material in this embodiment, a lithium complex compound that is represented by Formula (1) above and contains an atomic ratio $Ti^{3+}/Ti^{4+}$ between $Ti^{3+}$ and $Ti^{4+}$, as determined on the basis of XPS, of greater than or equal to 1.5 and less than or equal to 20 can be obtained by firing a mixture, which has been obtained by mixing predetermined starting materials at a predetermined ratio in the mixing step S1, under an oxidizing atmosphere in the firing step S2. With the thus obtained lithium complex compound, a positive-electrode material, which is a powder-form positive-electrode active material, can be formed.

In particular, when an organic titanium compound is used as the Ti-containing compound in the mixing step S1, the organic titanium compound can be mixed with the powder of the other starting materials more uniformly. More specifically, the organic titanium compound can be mixed in a liquid state in the mixing step S1, and thus can be dispersed more uniformly in the mixture as compared to when other Ti-containing compounds are used. Accordingly, a uniform solid-phase reaction of the Ti-containing compound can be realized in the firing step S2, and thus, a lithium complex compound having an atomic ratio $Ti^{3+}/Ti^{4+}$ between $Ti^{3+}$ and $Ti^{4+}$ of greater than or equal to 1.5 and less than or equal to 20 can be obtained more efficiently.

Meanwhile, when titanium oxide is used as the Ti-containing compound, the amount of the component dissolved in the final drying in the mixing step S1 becomes smaller than that when an organic titanium compound is used. Further, the amount of gas generated in the firing step S2 becomes smaller. Accordingly, voids become less likely to be generated in the secondary particles, and the strength of the particles thus becomes likely to be high.

Figure 3A:
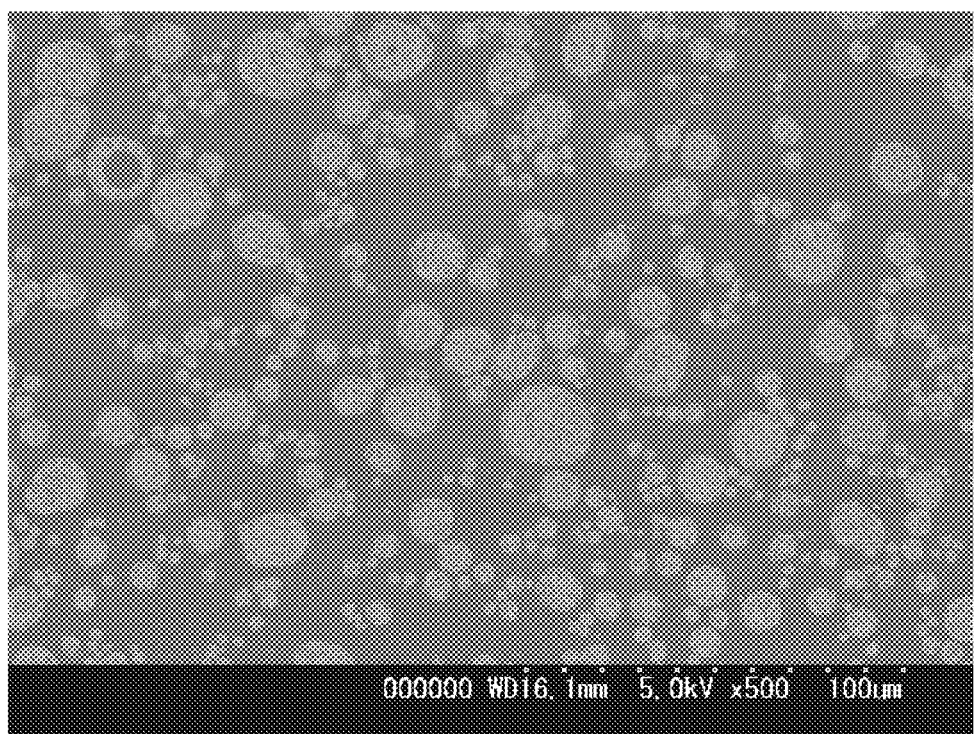
FIG. 3A is a photograph of a cross-section of secondary particles obtained when titanium oxide is used in a mixing step.
Figure 3B:
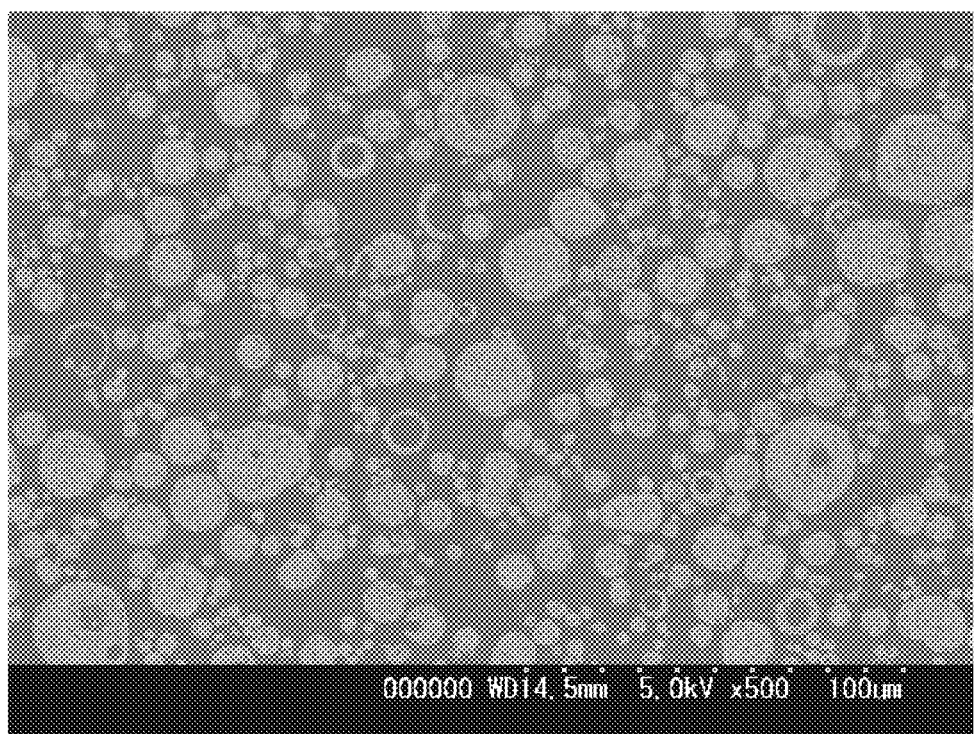
FIG. 3B is a photograph of a cross-section of secondary particles obtained when an organic titanium compound is used in a mixing step.

FIG. 3A is a microscope photograph of the secondary particles obtained when titanium oxide is used as the Ti-containing compound in the mixing step S1. FIG. 3B is a microscope photograph of the secondary particles obtained when an organic titanium compound is used as the Ti-containing compound in the mixing step S1. Referring to the secondary particles obtained when titanium oxide is used as the Ti-containing compound in mixing step S1 (FIG. 3A), generation of voids is suppressed as compared to the secondary particles obtained when an organic titanium compound is used (FIG. 3B).

In addition, as shown in FIG. 1B, the method for producing a positive-electrode material in this embodiment may further include an immersing step S3. In the immersing step S3, the positive-electrode material for a lithium ion secondary battery, which has been produced through the mixing step S1 and the firing step S2, is immersed in an organic solvent that contains dissolved therein a boroxine compound represented by Formula (2) below and fluoride, and is then filtrated and dried, so that the surface of the positive-electrode material for the lithium ion secondary battery is treated.

$$(BO)_3(OR)_3 \quad (2)$$

It should be noted that R in Formula (2) above is an organic group having 1 or more carbon atoms. Examples of the organic group (R) in the boroxine compound represented by Formula (2) above include a straight-chain or branched-chain alkyl group and a cycloalkylaryl group. Specific examples of such an organic group (R) include an ethyl group, n-propyl group, isopropyl group, n-butyl group, sec-butyl group, isobutyl group, and cyclohexyl group. The organic group (R) may also include halogen atoms typified by fluorine atoms, chlorine atoms, or bromine atoms; nitrogen atoms; and sulfur atoms.

The alkyl group may have a branched chain, and, if it has a branched chain, a chain alkyl group of a portion that constitutes the straight chain has 3 or more carbon atoms. Although the upper limit of the number of carbon atoms in the organic group that constitutes R is not particularly limited, the upper limit (the upper limit of the total number of carbon atoms in the organic group that constitutes R) is preferably less than or equal to 6 from a perspective of facilitating the production. R may also have any substituent (halogen, nitrogen, sulfur, or the like).

Specific examples of the alkyl group include, but are not limited to, a straight-chain alkyl group represented by $R=C_aH_b$ (where C is a carbon atom, H is a hydrogen atom, a is an integer of greater than or equal to 3, and b is a number satisfying $b=2a+1$), specifically, a straight-chain saturated hydrocarbon group or a branched-chain alkyl group, such as a propyl group, butyl group, pentyl group, hexyl group, heptyl group, octyl group, nonyl group, or decyl group, and more specifically, an isopropyl group, 1-methyl-propyl group, 1-ethyl-propyl group, 2-methyl-propyl group, 1-methyl-butyl group, 1-ethyl-butyl group, 2-methyl-butyl group, 2-ethyl-butyl group, 3-methyl-butyl group, 1-methyl-pentyl group, 1-ethyl-pentyl group, 1-propyl-pentyl group, 2-methyl-pentyl group, 2-ethyl-pentyl group, 2-propyl-pentyl group, 3-methyl-pentyl group, 3-ethyl-pentyl group, 4-methyl-pentyl group, 1-methyl-hexyl group, 1-ethyl-hexyl group, 1-propyl-hexyl group, 1-butyl-hexyl group, 1-pentyl-hexyl group, 2-methyl-hexyl group, 2-ethyl-hexyl group, 2-propyl-hexyl group, 2-butyl-hexyl group, 3-methyl-hexyl group, 3-ethyl-hexyl group, 3-propyl-hexyl group, 4-methyl-hexyl group, 4-ethyl-hexyl group, or 5-methyl-hexyl group.

As the boroxine compound, a compound having as an organic group (R) a secondary alkyl group with 1 to 6 carbon atoms is preferably used. If the organic group (R) is primary, the molecular structure of the boroxine compound is unstable, and thus tends to be difficult to use. Meanwhile, if the organic group (R) is tertiary, the insolubility of the boroxine compound is high. Thus, the boroxine compound is difficult to dissolve in an electrolytic solution. In contrast, if the organic group (R) is secondary, the boroxine compound is difficult to decompose and can obtain appropriate solubility, which is advantageous. As the boroxine compound, tri-iso-propoxy boroxine (TiPBx) is preferably used. Among the boroxine compounds, a hydrocarbon group in which R has 2 to 6 carbon atoms is preferably used.

Specific examples of the boroxine compound include trimethoxyboroxin $((O-CH_3)_3(BO)_3)$, triethoxyboroxin $((O-CH_2CH_3)_3(BO)_3)$, triisopropoxyboroxin $((O-CH(CH_3)_2)_3(BO)_3)$, and tris(cyclohexyloxy)boroxine $((O-C_6H_{11})_3(BO)_3)$.

The organic solvent may be any solvent that can maintain the solubility of TiPBx. Examples of such solvent include an aprotic solvent. For example, dimethyl carbonate, acetone, acetonitrile, chloroform, ether, NMP, or dimethyl sulfoxide (DMSO) can be used.

Fluoride that is dissolved in the organic solvent together with the boroxine compound, such as TiPBx, is preferably lithium hexafluorophosphate ($LiPF_6$), though not particularly limited thereto. TiPBx and $LiPF_6$ can be mixed at a molar ratio of 1:1, for example. The immersion time can be appropriately selected, for example, 30 minutes to 6 hours, in accordance with the specific surface area of the positive-electrode material or the concentration of the boroxine compound. In drying after filtration, it is acceptable as long as the organic solvent components can be removed. For example, drying is performed in a vacuum at 120° C. for 1 hour with the temperature, time, and pressure appropriately selected.

When the surfaces of the particles of the positive-electrode material are treated using a solvent containing TiPBx and $LiPF_6$, the surfaces of the particles are fluorinated, and a positive-electrode active material having a boron-containing compound on the surfaces of the particles can be obtained. Accordingly, the surfaces of the particles of the positive-electrode material are modified, and elution of transition metal as well as decomposition of the nonaqueous solvent is suppressed. Accordingly, the cycle characteristics of the secondary battery are improved.

Fluorination of the surfaces of the particles can be confirmed through X-ray photoelectron spectroscopy (XPS) analysis. Specifically, whether the surfaces of the secondary particles have been fluorinated or not can be confirmed with the following method.

Focusing on Ni that is the main component, a binding spectrum of Ni-2p2/3 is acquired. The spectrum is analyzed as superposed spectra of the following three components. A first component is a spectrum with a binding energy of 855.7±0.5 eV derived from Ni—O, a second component is a spectrum with a binding energy of 857.4±0.5 eV derived from Ni—F, and a third component is a spectrum with a binding energy of 862±0.5 eV that is the average of the satellite peaks of the two components. Performing fitting analysis on the three superposed spectra and determining the area ratio of the Ni—F spectrum using the total sum of the areas of the first and second spectra can determine the presence or absence of fluorination.

(Positive Electrode and Lithium Ion Secondary Battery)

Figure 2:
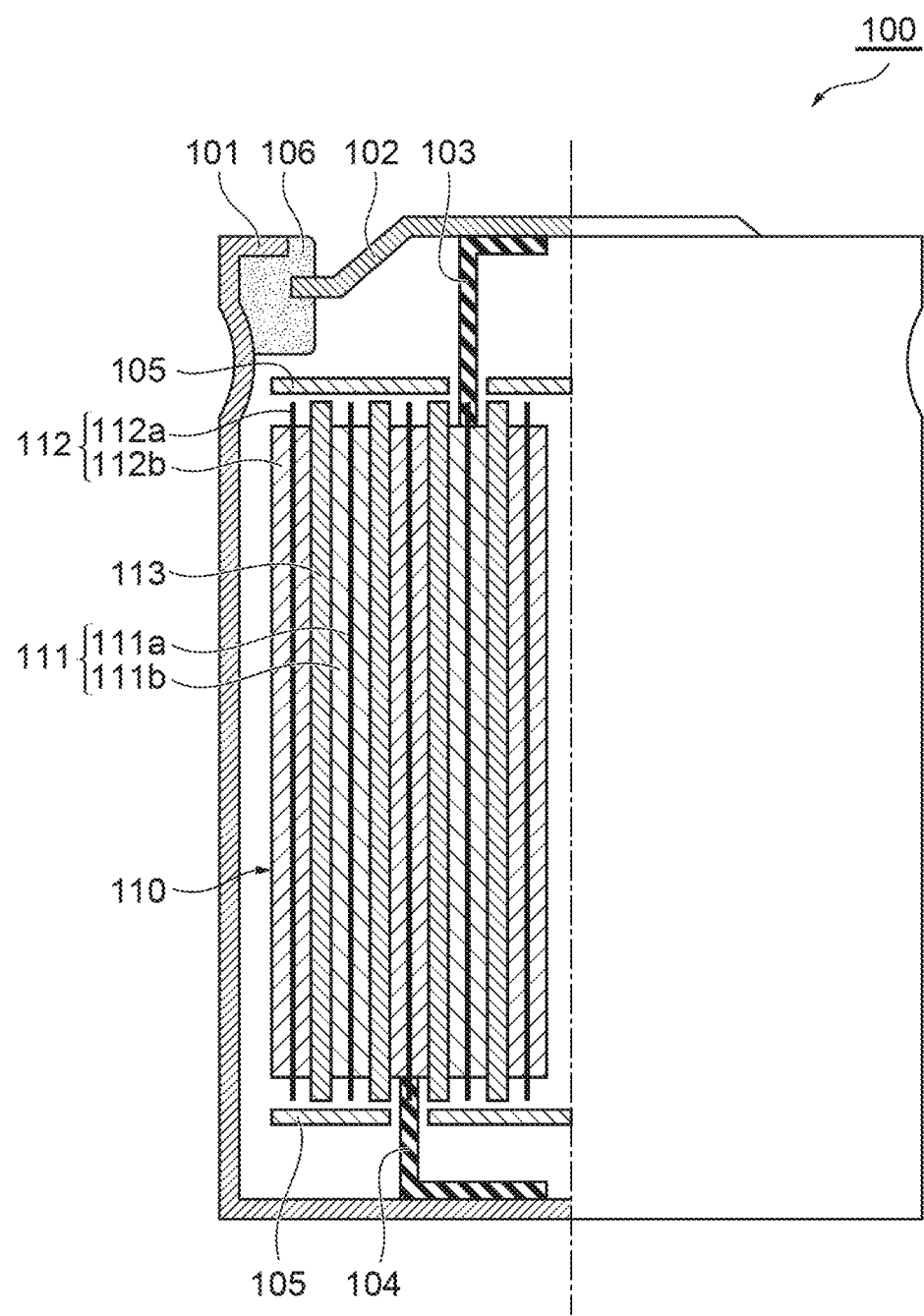
FIG. 2 is a schematic partial cross-sectional view of a lithium ion secondary battery and a positive electrode in accordance with an embodiment of the present invention.

Hereinafter, a positive electrode for a lithium ion secondary battery that uses the aforementioned positive-electrode material, and a lithium ion secondary battery that uses the positive electrode will be described. FIG. 2 is a schematic partial cross-sectional view of the lithium ion secondary battery in this embodiment.

A lithium ion secondary battery 100 in this embodiment is cylindrical in shape, for example, and includes a cylindrical battery can 101 with a bottom, which houses a nonaqueous electrolytic solution therein, a wound electrode group 110 housed in the battery can 101, and a disk-shaped battery lid 102 that seals an opening at the top of the battery can 101. The battery can 101 and the battery lid 102 are produced using a metallic material, such as stainless steel or aluminum, for example, and the battery lid 102 is secured to the battery can 101 through swaging or the like via a sealing material 106 made of an insulating resin material, whereby the battery can 101 is sealed by and is electrically insulated from the battery lid 102. It should be noted that the shape of the lithium ion secondary battery 100 is not limited to a cylindrical shape, and any shape such as a rectangle, button, or laminate sheet can be adopted.

The wound electrode group 110 is produced by winding a long-strip-shaped positive electrode 111 and a long-strip-shaped negative electrode 112, which are arranged opposite each other with a long-strip-shaped separator 113 interposed therebetween, around the central axis of the winding. In the wound electrode group 110, a positive-electrode current collector 111a is electrically connected to the battery lid 102 via a positive-electrode lead strip 103, and a negative-electrode current collector 112a is electrically connected to the bottom of the battery can 101 via a negative-electrode lead strip 104. Insulating plates 105 for preventing short are arranged between the wound electrode group 110 and the battery lid 102 and between the wound electrode group 110 and the bottom of the battery can 101. The positive-electrode lead strip 103 and the negative-electrode lead strip 104 are current extracting members produced using similar materials to those of the positive-electrode current collector 111a and the negative-electrode current collector 112a, respectively, and are bonded to the positive-electrode current collector 111a and the negative-electrode current collector 112a, respectively, through spot welding, ultrasonic welding, or the like.

The positive electrode 111 in this embodiment includes the positive-electrode current collector 111a and a positive electrode mixture layer 111b formed on the surface of the positive-electrode current collector 111a. For the positive-electrode current collector 111a, a metal foil of aluminum, aluminum alloy, or the like; expanded metal; or perforated metal can be used, for example. The metal foil can be formed to a thickness of about greater than or equal to 15 μm and less than or equal to 25 μm, for example. The positive-electrode mixture layer 111b includes the aforementioned positive-electrode material. In addition, the positive-electrode mixture layer 111b may also include a conductive material, binder, and the like.

The negative electrode 112 includes a negative-electrode current collector 112a and a negative-electrode mixture layer 112b formed on the surface of the negative-electrode current collector 112a. For the negative-electrode current collector 112a, a metal foil of copper, copper alloy, nickel, nickel alloy, or the like; expanded metal; perforated metal; or the like can be used. The metal foil can be formed to a thickness of about greater than or equal to 7 μm and less than or equal to 10 μm, for example. The negative-electrode mixture layer 112b includes a negative-electrode active material that is used for common lithium ion secondary batteries. In addition, the negative-electrode mixture layer 112b may also include a conductive material, binder, and the like.

For the negative-electrode active material, for example, one or more of a carbon material, a metallic material, and metal oxide can be used. For the carbon material, graphites such as natural graphite or artificial graphite; carbides such as coke or pitch; amorphous carbon; carbon fibers; or the like can be used. For the metallic material, lithium, silicon, tin, aluminum, indium, gallium, magnesium, or alloys thereof can be used. For the metal oxide material, metal oxide including tin, silicon, lithium, titanium, or the like can be used.

For the separator 113, a microporous film or a nonwoven fabric of polyolefin-based resin, such as polyethylene, polypropylene, polyethylene-polypropylene copolymer; polyamide resin; or aramid resin can be used, for example.

The positive electrode 111 and the negative electrode 112 can be each formed through a mixture preparing step, a mixture coating step, and a molding step, for example. In the mixture preparing step, a mixture slurry is prepared by stirring and homogenizing a positive-electrode active material or a negative-electrode active material together with a solution containing a conductive material and a binder, for example, using a stirring means such as a planetary mixer, a dispersion mixer, or a rotation-revolution mixer, for example.

For the conductive material, conductive materials used for common lithium ion secondary batteries can be used. Specifically, carbon particles or carbon fibers, such as a graphite powder, acetylene black, furnace black, thermal black, or channel black, can be used as the conductive material. The content of the conductive material can be set to about greater than or equal to 3 mass % and less than or equal to 10 mass % relative to the total mass of the mixture, for example.

For the binder, binders used for common lithium ion secondary batteries can be used. Specifically, polyvinylidene fluoride (PVDF), polytetrafluoroethylene, polyhexafluoropropylene, styrene-butadiene rubber, carboxymethylcellulose, polyacrylonitrile, or modified polyacrylonitrile can be used as the binder, for example. The content of the binder can be set to about greater than or equal to 2 mass % and less than or equal to 10 mass % relative to the total mass of the mixture, for example. The negative-electrode active material and the binder are desirably mixed at a weight ratio of 95:5, for example.

The solvent of the solution can be selected from N-methylpyrrolidone, water, N,N-dimethylformamide, N,N-dimethylacetamide, methanol, ethanol, propanol, isopropanol, ethylene glycol, diethylene glycol, glycerin, dimethyl sulfoxide, tetrahydrofuran, or the like in accordance with the type of the binder used.

In the mixture coating step, first, the surfaces of the positive-electrode current collector 111a and the negative-electrode current collector 112a are coated with the mixture slurry containing the positive-electrode active material and the mixture slurry containing the negative-electrode active material, which have been prepared in the mixture preparing step, respectively, using a coating means such as a bar coater, a doctor blade, or a transfer roller, for example. Next, heat treatment is applied to the positive-electrode current collector 111a and the negative-electrode current collector 112a each coated with the mixture slurry, whereby the solvent of the solution contained in the mixture slurry is volatilized or vaporized to be removed, and thus, the positive-electrode mixture layer 111b and the negative-electrode mixture layer 112b are formed on the surfaces of the positive-electrode current collector 111a and the negative-electrode current collector 112a, respectively.

In the molding step, first, the positive-electrode mixture layer 111b formed on the surface of the positive-electrode current collector 111a and the negative-electrode mixture layer 112b formed on the surface of the negative-electrode current collector 112a are subjected to pressure molding using a pressure means, such as a roll press, for example. Accordingly, the positive-electrode mixture layer 111b can be pressed to a thickness of about greater than or equal to 100 μm and less than or equal to 300 μm, for example, while the negative-electrode mixture layer 112b can be pressed to a thickness of about greater than or equal to 20 μm and less than or equal to 150 μm, for example. After that, the positive-electrode current collector 111a and the positive-electrode mixture layer 111b as well as the negative-electrode current collector 112a and the negative-electrode mixture layer 112b are each cut into a long strip shape, whereby the positive electrode 111 and the negative electrode 112 can be produced.

The thus produced positive electrode 111 and negative electrode 112 are wound around the central axis of the winding in a state in which the positive electrode 111 and the negative electrode 112 are opposite each other with the separator 113 interposed therebetween, whereby the wound electrode group 110 is formed. In the wound electrode group 110, the negative-electrode current collector 112a is connected to the bottom of the battery can 101 via the negative-electrode lead strip 104, while the positive-electrode current collector 111a is connected to the battery lid 102 via the positive-electrode lead strip 103, and the wound electrode group 110 is housed in the battery can 101 while short between the battery can 101 and the battery lid 102 is prevented by the insulating plate 105 or the like. After that, a nonaqueous electrolytic solution is injected into the battery can 101, and the battery lid 102 is secured to the battery can 101 via the sealing material 106 so as to hermetically seal the battery can 101, whereby the lithium ion secondary battery 100 can be produced.

For the electrolytic solution injected into the battery can 101, it is preferable to use an electrolytic solution obtained by dissolving, as an electrolyte, lithium hexafluorophosphate ($LiPF_6$), lithium tetrafluoroborate ($LiBF_4$), lithium perchlorate ($LiClO_4$), or the like in a solvent such as diethyl carbonate (DEC), dimethyl carbonate (DMC), ethylene carbonate (EC), propylene carbonate (PC), vinylene carbonate (VC), methyl acetate (MA), ethyl methyl carbonate (EMC), or methyl propyl carbonate (MPC). The concentration of the electrolyte is desirably set to greater than or equal to 0.7 M and less than or equal to 1.5 M. In addition, the electrolytic solution may also be mixed with a compound containing an anhydrous carboxylic acid group, a compound containing a sulfur element, such as propanesultone, or a compound containing boron. Such compounds are added in order to suppress reductive decomposition of the electrolytic solution on the surface of the negative electrode, prevent reduction deposition of a metal element, such as manganese eluted from the positive electrode, on the negative electrode, improve the ion conductivity of the electrolytic solution, and increase the flame resistance of the electrolytic solution, and can be appropriately selected in accordance with purposes.

The lithium ion secondary battery 100 with the aforementioned structure is configured such that power supplied from the outside can be stored in the wound electrode group 110 using the battery lid 102 as a positive-electrode outside terminal and using the bottom of the battery can 101 as a negative-electrode outside terminal, and the power stored in the wound electrode group 110 can be supplied to the outside device and the like. In this manner, the lithium ion secondary battery 100 in this embodiment can be used as a small power supply for portable electronic devices or home electric appliances; an uninterruptible power supply; a stationary power supply such as a power leveling device; or a drive power supply for vessels, railways, hybrid vehicles, electric vehicles, or the like.

In the lithium ion secondary battery 100 in this embodiment, the mixture layer 111b of the positive electrode 111 contains the aforementioned positive-electrode material. Therefore, a secondary battery with a higher charge-discharge capacity than those of the conventional secondary batteries, a suppressed resistance increase rate, excellent cycle characteristics, and excellent low-temperature output characteristics is provided.

Although the embodiments of the present invention have been described in detail with reference to the drawings, specific structures are not limited thereto, and any design changes and the like that may occur within the spirit and scope of the present invention are all included in the present invention.

EXAMPLES

Hereinafter, Examples of the positive-electrode material and the method for producing the positive-electrode material of the present invention, and Comparative Examples that are not included in the present invention will be described.

Example 1

A positive-electrode material of Example 1 was produced in accordance with the following procedures. First, lithium carbonate, nickel hydroxide, cobalt carbonate, manganese carbonate, and a titanium-containing chelating agent (titanium lactate ammonium salt) were prepared as the starting materials of the positive-electrode material. Next, a mixing step of mixing such starting materials was performed. Specifically, the starting materials were weighed so that the atomic ratio of Li:Ni:Co:Mn became 1.04:0.80:0.15:0.05.

The mixing step was performed by adding a titanium-containing chelating agent to the aforementioned weighed starting materials so that the content of Ti became 1 mol provided that the total number of moles of Ni, Co, and Mn was 100 mol, and grinding the mixture with a grinder and wet-mixing it to prepare a slurry. Then, the obtained slurry was dried with a spray dryer to obtain a mixed powder that is the mixture of the aforementioned starting materials. The sizes of the secondary particles of the obtained mixed powder were about 10 µm.

Next, a firing step of firing the mixture obtained in the mixing step was performed. Specifically, the mixed powder obtained in the mixing step was fired in a firing step including a first heat treatment step, a second heat treatment step, and a third heat treatment step.

In the first heat treatment step, an alumina container with a depth of 300 mm, a width of 300 mm, and a height of 100 mm was filled with a 1 kg mixture obtained in the mixing step, and heat treatment was performed with a continuous transfer furnace at a heat treatment temperature of 350° C. under an air atmosphere for 1 hour, whereby a powder of a first precursor was obtained. In this step, water vapor is generated along with the thermal decomposition of nickel hydroxide, and carbon dioxide is also generated along with the thermal decomposition of cobalt carbonate and manganese carbonate.

In the second heat treatment step, the powder of the first precursor obtained in the first heat treatment step is subjected to heat treatment at a heat treatment temperature of 600° C. in an oxygen stream for 10 hours, using a continuous transfer furnace, which has an atmosphere substituted so that it has greater than or equal to 90% oxygen concentration inside the furnace, whereby a powder of a second precursor was obtained. In this step, cobalt carbonate and manganese carbonate that have not reacted completely in the first heat treatment step are thermally decomposed, thus generating carbon dioxide. Further, as the reaction of lithium carbonate with Ni, Co, Mn, and Ti progresses, carbon dioxide is generated.

In the third heat treatment step, the powder of the second precursor obtained in the second heat treatment step is subjected to heat treatment at a heat treatment temperature of 785° C. in an oxygen stream for 10 hours, using a continuous transfer furnace, which has an atmosphere substituted so that it has greater than or equal to 90% oxygen concentration inside the furnace, whereby a powder of a lithium complex compound was obtained. The obtained powder of the lithium complex compound was classified using a sieve with an opening of less than or equal to 53 μm, and a positive-electrode material was thus formed with the classified powder of the lithium complex compound.

The element ratio of the positive-electrode material of Example 1 obtained through the aforementioned steps was measured with ICP to obtain a composition formula of a lithium complex compound that forms the positive-electrode material of Example 1. In addition, the positive-electrode material of Example 1 was analyzed through XPS to measure a Ti2p spectrum, which was then fitted using two spectra derived from $Ti_2O_3(Ti^{3+})$ and $TiO_2(Ti^{4+})$ using analysis software "PHI MultiPak (registered trademark)" produced by ULVAC-PHI, Inc. At that time, fitting was performed so that "Chi-squared" (Pearson's chi-square), which is a reliability parameter for fitting, became less than or equal to 10. The obtained area ratio between $Ti^{3+}$ and $Ti^{4+}$ was set to the atomic ratio $Ti^{3+}/Ti^{4+}$ between $Ti^{3+}$ and $Ti^{4+}$ of the lithium complex compound that forms the positive-electrode active material of Example 1.

In addition, in order to evaluate the stability of the oxide, the weight reduction rate of the positive-electrode material of Example 1 when the temperature was increased from the room temperature to 1000° C. at a rate of 10° C./minute in a nitrogen atmosphere was measured through thermogravimetric analysis.

Further, positive-electrode material particles with secondary particle sizes of 5 to 10 μm were selected using an optical microscope, and each particle was compressed with a flat indenter with a diameter of 50 μm at a load rate of 0.47 m·N/s using a micro compression testing machine (MCT-510 produced by Shimadzu Scientific Instruments) so as to measure the fracture strength of the particle. In addition, after the positive-electrode material and the glassware were dried in a vacuum at 120° C. for 2 hours, the specific surface area of the positive-electrode material was measured using an automatic specific surface area/pore size distribution measuring device (BELSORP-mini produced by Microtrac-BEL Corp.).

Example 2

A positive-electrode material of Example 2 was obtained by producing a positive-electrode material in the same manner as in Example 1 except that the heat treatment temperature in the third heat treatment step was set to 800° C. The obtained positive-electrode material of Example 2 was analyzed as with the positive-electrode material of Example 1 so as to obtain a composition formula, the atomic ratio $Ti^{3+}/Ti^{4+}$, the weight reduction rate (through thermogravimetric analysis), the particle fracture strength, and the specific surface area of a lithium complex compound that forms the positive-electrode material of Example 2.

Example 3

A positive-electrode material of Example 3 was obtained by producing a positive-electrode material in the same manner as in Example 1 except that the amount of the titanium-containing chelating agent added in the mixing step was set so that the number of moles of Ti became 2. The obtained positive-electrode material of Example 3 was analyzed as with the positive-electrode material of Example 1 so as to obtain a composition formula, the atomic ratio $Ti^{3+}/Ti^{4+}$, the particle fracture strength, and the specific surface area of a lithium complex compound that forms the positive-electrode material of Example 3.

Example 4

A positive-electrode material of Example 4 was obtained by producing a positive-electrode material in the same manner as in Example 1 except that the amount of the titanium-containing chelating agent added in the mixing step was set so that the number of moles of Ti became 3. The obtained positive-electrode material of Example 4 was analyzed as with the positive-electrode material of Example 1 so as to obtain a composition formula, the atomic ratio $Ti^{3+}/Ti^{4+}$, the particle fracture strength, and the specific surface area of a lithium complex compound that forms the positive-electrode material of Example 4.

Example 5

A positive-electrode material of Example 5 was obtained by producing a positive-electrode material in the same manner as in Example 2 except that the Li content was increased such that the atomic ratio of Li:Ni:Co:Mn became 1.08:0.80:0.15:0.05 in the mixing step. The obtained positive-electrode material of Example 5 was analyzed as with the positive-electrode material of Example 1 so as to obtain a composition formula, the atomic ratio $Ti^{3+}/Ti^{4+}$, the particle fracture strength, and the specific surface area of a lithium complex compound that forms the positive-electrode material of Example 5.

Example 6

A positive-electrode material of Example 6 was obtained by producing a positive-electrode material in the same manner as in Example 2 except that the Li content was reduced such that the atomic ratio of Li:Ni:Co:Mn became 1.02:0.80:0.15:0.05 in the mixing step. The obtained positive-electrode material of Example 6 was analyzed as with the positive-electrode material of Example 1 so as to obtain a composition formula, the atomic ratio $Ti^{3+}/Ti^{4+}$, the particle fracture strength, and the specific surface area of a lithium complex compound that forms the positive-electrode material of Example 6.

Example 7

Titanium oxide ($TiO_2$) was prepared as a titanium raw material, and Li, Ni, Co, Mn, and Ti were weighed so that the atomic ratio of Li:Ni:Co:Mn:Ti became 1.04:0.79:0.15:0.05:0.01. Then, a mixing step was performed by grinding such materials with a grinder and wet-mixing it to prepare a slurry. In the mixing step, the materials were ground until the average particle size of the solid portion of the slurry became 0.15 μm. Then, the obtained slurry was dried with a spray dryer to obtain a mixed powder that is the mixture of the aforementioned starting materials. After that, a firing step was performed as in Example 2 to obtain a positive-electrode material of Example 7. The obtained positive-electrode material of Example 7 was analyzed as with the positive-electrode material of Example 1 so as to obtain a composition formula, the atomic ratio $Ti^{3+}/Ti^{4+}$, the particle fracture strength, and the specific surface area of a lithium complex compound that forms the positive-electrode material of Example 7.

Example 8

A positive-electrode material of Example 8 was obtained by producing a positive-electrode material in the same manner as in Example 7 except that the average particle size of the solid portion of the slurry became 0.35 μm in the mixing step. The obtained positive-electrode material of Example 8 was analyzed as with the positive-electrode material of Example 1 so as to obtain a composition formula, the atomic ratio $Ti^{3+}/Ti^{4+}$, the particle fracture strength, and the specific surface area of a lithium complex compound that forms the positive-electrode material of Example 8.

Example 9

A positive-electrode material of Example 9 was obtained by producing a positive-electrode material in the same manner as in Example 1 except that the heat treatment temperature in the third heat treatment step was set to 815° C. The obtained positive-electrode material of Example 9 was analyzed as with the positive-electrode material of Example 1 so as to obtain a composition formula, the atomic ratio $Ti^{3+}/Ti^{4+}$, the particle fracture strength, and the specific surface area of a lithium complex compound that forms the positive-electrode material of Example 9.

Comparative Example 1

A positive-electrode material of Comparative Example 1 was obtained by producing a positive-electrode material in the same manner as in Example 1 except that titanium oxide was not added and the heat treatment temperature in the third heat treatment step was set to 770° C. The obtained positive-electrode material of Comparative Example 1 was analyzed as with the positive-electrode material of Example 1 so as to obtain a composition formula, the weight reduction rate (through thermogravimetric analysis), the particle fracture strength, and the specific surface area of a lithium complex compound that forms the positive-electrode material of Comparative Example 1.

Comparative Example 2

A positive-electrode material of Comparative Example 2 was obtained by producing a positive-electrode material in the same manner as in Example 1 except that the heat treatment temperature in the third heat treatment step was set to 755° C. The obtained positive-electrode material of Comparative Example 2 was analyzed as with the positive-electrode material of Example 1 so as to obtain a composition formula, the atomic ratio $Ti^{3+}/Ti^{4+}$, the weight reduction rate (through thermogravimetric analysis), the particle fracture strength, and the specific surface area of a lithium complex compound that forms the positive-electrode material of Comparative Example 2.

Comparative Example 3

A positive-electrode material of Comparative Example 3 was obtained by producing a positive-electrode material in the same manner as in Example 1 except that the heat treatment temperature in the third heat treatment step was set to 770° C. The obtained positive-electrode material of Comparative Example 3 was analyzed as with the positive-electrode material of Example 1 so as to obtain a composition formula, the atomic ratio $Ti^{3+}/Ti^{4+}$, the weight reduction rate (through thermogravimetric analysis), the particle fracture strength, and the specific surface area of a lithium complex compound that forms the positive-electrode material of Comparative Example 3.

Comparative Example 4

A positive-electrode material of Comparative Example 4 was obtained by producing a positive-electrode material in the same manner as in Example 1 except that the amount of the titanium-containing chelating agent added in the mixing step was set so that the number of moles of Ti became 4. The obtained positive-electrode material of Comparative Example 4 was analyzed as with the positive-electrode material of Example 1 so as to obtain a composition formula, the atomic ratio $Ti^{3+}/Ti^{4+}$, the particle fracture strength, and the specific surface area of a lithium complex compound that forms the positive-electrode material of Comparative Example 4.

Table 1A below shows the composition formula, the value of a/e in the composition formula, the heat treatment temperature (firing temperature) in the third heat treatment step included in the firing step, the type of the Ti raw material, and the particle size after grinding of each of the positive-electrode materials of Example 1 to Comparative Example 4. In addition, Table 1A also shows the atomic ratio $Ti^{3+}/Ti^{4+}$ between $Ti^{3+}$ and $Ti^{4+}$ of each of the lithium complex compounds that form the positive-electrode materials of Examples 1 to 9 and Comparative Examples 2 to 4.

TABLE 1A

| | Composition Formula $Li_{(1+a)}Ni_bMn_cCo_dTi_eO_{2+\alpha}$ | a/e | Baking Temperature (° C.) | Type of Ti Raw Material Particle Size after Grinding | $\dfrac{Ti^{3+}}{Ti^{4+}}$ |
|---|---|---|---|---|---|
| Example 1 | $Li_{1.02}Ni_{0.79}Mn_{0.05}Co_{0.15}Ti_{0.01}O_{2+\alpha}$ | 2 | 785 | Chelate | 1.9 |
| Example 2 | $Li_{1.02}Ni_{0.79}Mn_{0.05}Co_{0.15}Ti_{0.01}O_{2+\alpha}$ | 2 | 800 | Chelate | 2.8 |
| Example 3 | $Li_{1.02}Ni_{0.78}Mn_{0.05}Co_{0.15}Ti_{0.02}O_{2+\alpha}$ | 1 | 785 | Chelate | 2.0 |
| Example 4 | $Li_{1.02}Ni_{0.78}Mn_{0.04}Co_{0.16}Ti_{0.03}O_{2+\alpha}$ | 0.66 | 785 | Chelate | 2.1 |
| Example 5 | $Li_{1.06}Ni_{0.79}Mn_{0.05}Co_{0.15}Ti_{0.01}O_{2+\alpha}$ | 6 | 800 | Chelate | 1.5 |
| Example 6 | $Li_{1.00}Ni_{0.79}Mn_{0.05}Co_{0.15}Ti_{0.01}O_{2+\alpha}$ | 0 | 800 | Chelate | 2.9 |
| Example 7 | $Li_{1.02}Ni_{0.79}Mn_{0.05}Co_{0.15}Ti_{0.01}O_{2+\alpha}$ | 2 | 800 | $TiO_2$ 0.15 μm | 2.7 |

TABLE 1A-continued

|  | Composition Formula $Li_{(1+a)}Ni_bMn_cCo_dTi_eO_{2+\alpha}$ | a/e | Baking Temperature (° C.) | Type of Ti Raw Material Particle Size after Grinding | $\dfrac{Ti^{3+}}{Ti^{4+}}$ |
|---|---|---|---|---|---|
| Example 8 | $Li_{1.02}Ni_{0.79}Mn_{0.05}Co_{0.15}Ti_{0.01}O_{2+\alpha}$ | 2 | 800 | $TiO_2$ 0.35 μm | 1.8 |
| Example 9 | $Li_{1.02}Ni_{0.79}Mn_{0.05}Co_{0.15}Ti_{0.01}O_{2+\alpha}$ | 2 | 815 | Chelate | 2.9 |
| Comparative Example 1 | $Li_{1.02}Ni_{0.80}Mn_{0.05}Co_{0.15}O_{2+\alpha}$ | — | 770 | — | — |
| Comparative Example 2 | $Li_{1.02}Ni_{0.79}Mn_{0.05}Co_{0.15}Ti_{0.01}O_{2+\alpha}$ | 2 | 755 | Chelate | 1.3 |
| Comparative Example 3 | $Li_{1.02}Ni_{0.79}Mn_{0.05}Co_{0.15}Ti_{0.01}O_{2+\alpha}$ | 2 | 770 | Chelate | 1.4 |
| Comparative Example 4 | $Li_{1.02}Ni_{0.77}Mn_{0.04}Co_{0.15}Ti_{0.04}O_{2+\alpha}$ | 0.5 | 785 | Chelate | 1.3 |

Table 1B below shows the composition formula of each of the positive-electrode materials of Example 1 to Comparative Example 4, and the weight reduction rate of each of the positive-electrode materials of Examples 1 and 2 and Comparative Examples 1 to 3 determined through thermogravimetric analysis when the temperature was increased from the room temperature to 1000° C. at a rate of 10° C./minute. In addition, Table 1B below also shows the particle fracture strength and the specific surface area of each of the positive-electrode materials of Example 1 to Comparative Example 4.

TABLE 1B

|  | Composition Formula $Li_{(1+a)}Ni_bMn_cCo_dTi_eO_{2+\alpha}$ | Weight Reduction Rate @1000° C. (%) | Particle Fracture Strength (MPa) | Specific Surface Area ($m^2/g$) |
|---|---|---|---|---|
| Example 1 | $Li_{1.02}Ni_{0.79}Mn_{0.05}Co_{0.15}Ti_{0.01}O_{2+\alpha}$ | −5.1 | 51 | 1.30 |
| Example 2 | $Li_{1.02}Ni_{0.79}Mn_{0.05}Co_{0.15}Ti_{0.01}O_{2+\alpha}$ | −5.9 | 67 | 0.76 |
| Example 3 | $Li_{1.02}Ni_{0.78}Mn_{0.05}Co_{0.15}Ti_{0.02}O_{2+\alpha}$ | — | 55 | 1.25 |
| Example 4 | $Li_{1.02}Ni_{0.78}Mn_{0.04}Co_{0.15}Ti_{0.03}O_{2+\alpha}$ | — | 53 | 1.33 |
| Example 5 | $Li_{1.06}Ni_{0.79}Mn_{0.05}Co_{0.15}Ti_{0.01}O_{2+\alpha}$ | — | 45 | 1.29 |
| Example 6 | $Li_{1.00}Ni_{0.79}Mn_{0.05}Co_{0.15}Ti_{0.01}O_{2+\alpha}$ | — | 74 | 0.81 |
| Example 7 | $Li_{1.02}Ni_{0.79}Mn_{0.05}Co_{0.15}Ti_{0.01}O_{2+\alpha}$ | — | 138 | 0.62 |
| Example 8 | $Li_{1.02}Ni_{0.79}Mn_{0.05}Co_{0.15}Ti_{0.01}O_{2+\alpha}$ | — | 83 | 0.85 |
| Example 9 | $Li_{1.02}Ni_{0.79}Mn_{0.05}Co_{0.15}Ti_{0.01}O_{2+\alpha}$ | — | 153 | 0.47 |
| Comparative Example 1 | $Li_{1.02}Ni_{0.80}Mn_{0.05}Co_{0.15}O_{2+\alpha}$ | −5.8 | 109 | 0.86 |
| Comparative Example 2 | $Li_{1.02}Ni_{0.79}Mn_{0.05}Co_{0.15}Ti_{0.01}O_{2+\alpha}$ | −5.9 | 40 | 2.54 |
| Comparative Example 3 | $Li_{1.02}Ni_{0.79}Mn_{0.05}Co_{0.15}Ti_{0.01}O_{2+\alpha}$ | −5.9 | 45 | 2.36 |
| Comparative Example 4 | $Li_{1.02}Ni_{0.77}Mn_{0.04}Co_{0.15}Ti_{0.04}O_{2+\alpha}$ | — | 42 | 1.81 |

The atomic ratio $Ti^{3+}/Ti^{4+}$ of the lithium composite oxide that forms the positive-electrode active material of each of Examples 1 to 9 is greater than or equal to 1.5, more specifically, greater than or equal to 1.9 except Example 5, whereas the atomic ratio $Ti^{3+}/Ti^{4+}$ of the lithium composite oxide that forms the positive-electrode active material of each of Comparative Examples 2 to 4 is as low as less than 1.5.

In addition, Comparative Example 1 without Ti added thereto has a particle fracture strength as high as greater than or equal to 100 MPa, while the other materials with Ti added thereto tend to have a low particle fracture strength. It is acceptable as long as the particle fracture strength is greater than or equal to about 45 MPa. Of the materials with Ti added thereto, Examples 2, 6, and 7 each having a higher atomic ratio $Ti^{3+}/Ti^{4+}$ of the lithium composite oxide have a relatively high particle fracture strength. In particular, Example 7 in which Ti oxide ($TiO_2$) was used as the Ti raw material has a high particle fracture strength. In addition, Example 9 in which the firing temperature was high has a specific surface area as small as less than or equal to 0.5 $m^2/g$, while each of Comparative Examples 2 and 3 in which the firing temperature was low has a specific surface area as large as greater than 2.0 $m^2/g$.

Figure 4A:
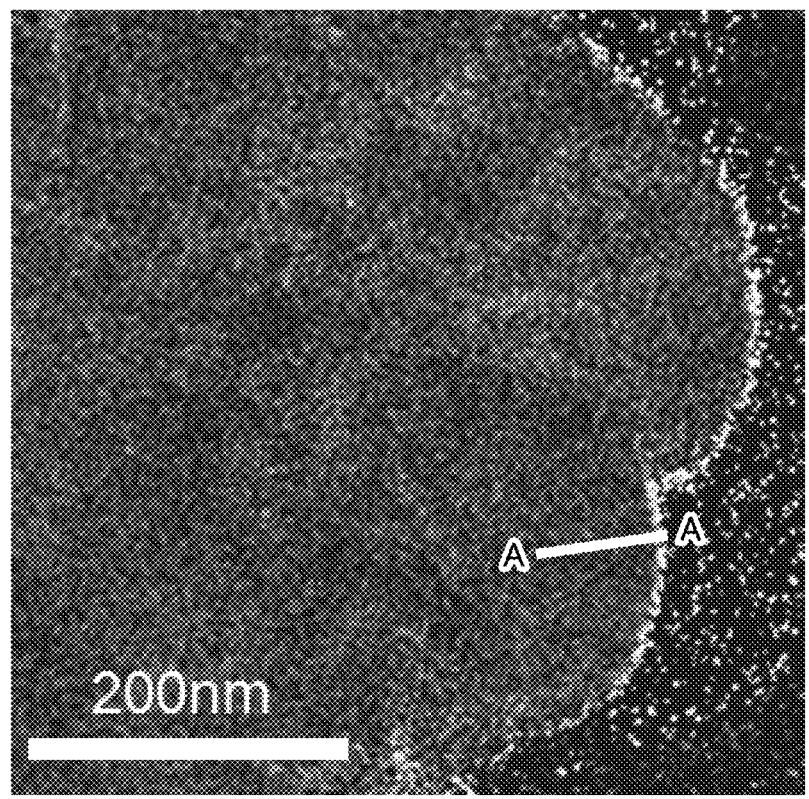
FIG. 4A is a mapped image of a Ti element in a primary particle of a positive-electrode material of Example 4.
Figure 4B:
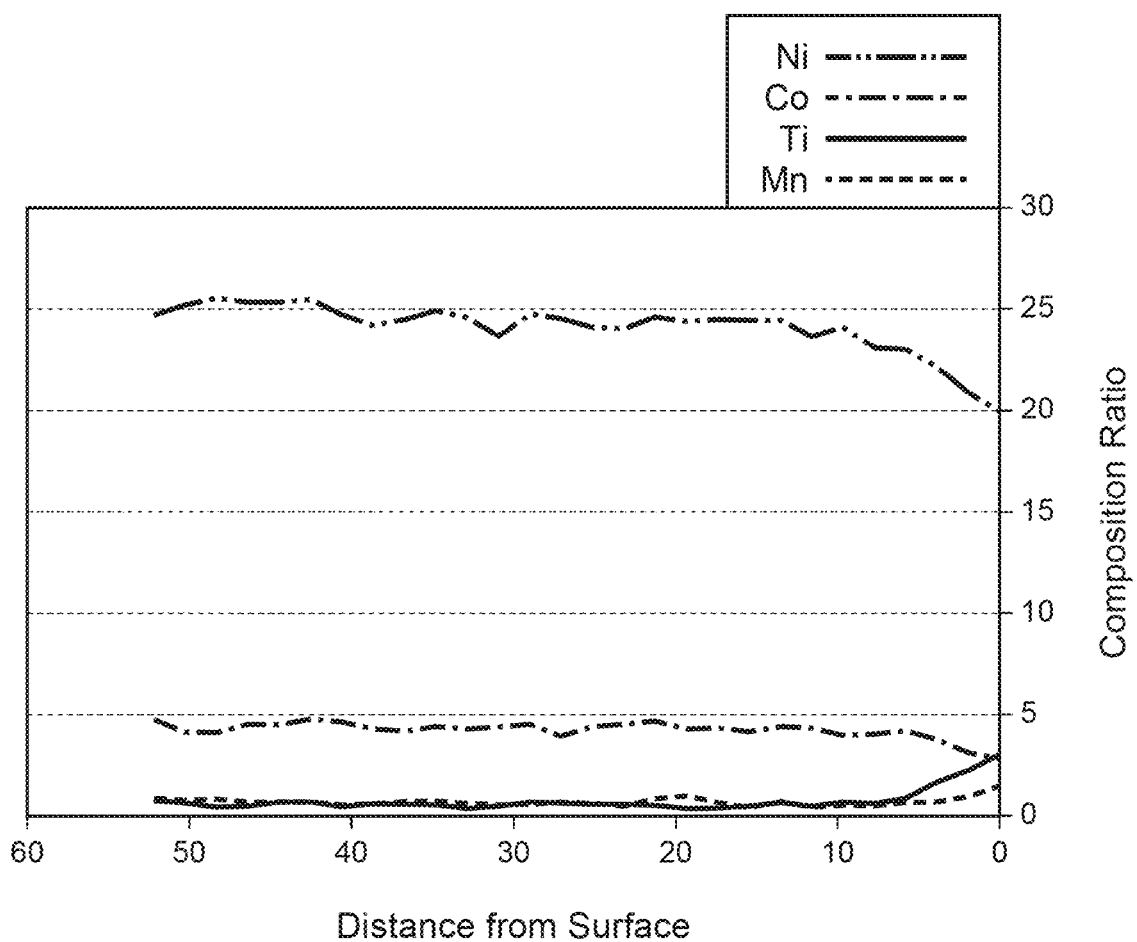
FIG. 4B is a graph illustrating the distance from the surface of the primary particle shown in FIG. 4A, and the composition ratio.
Figure 5:
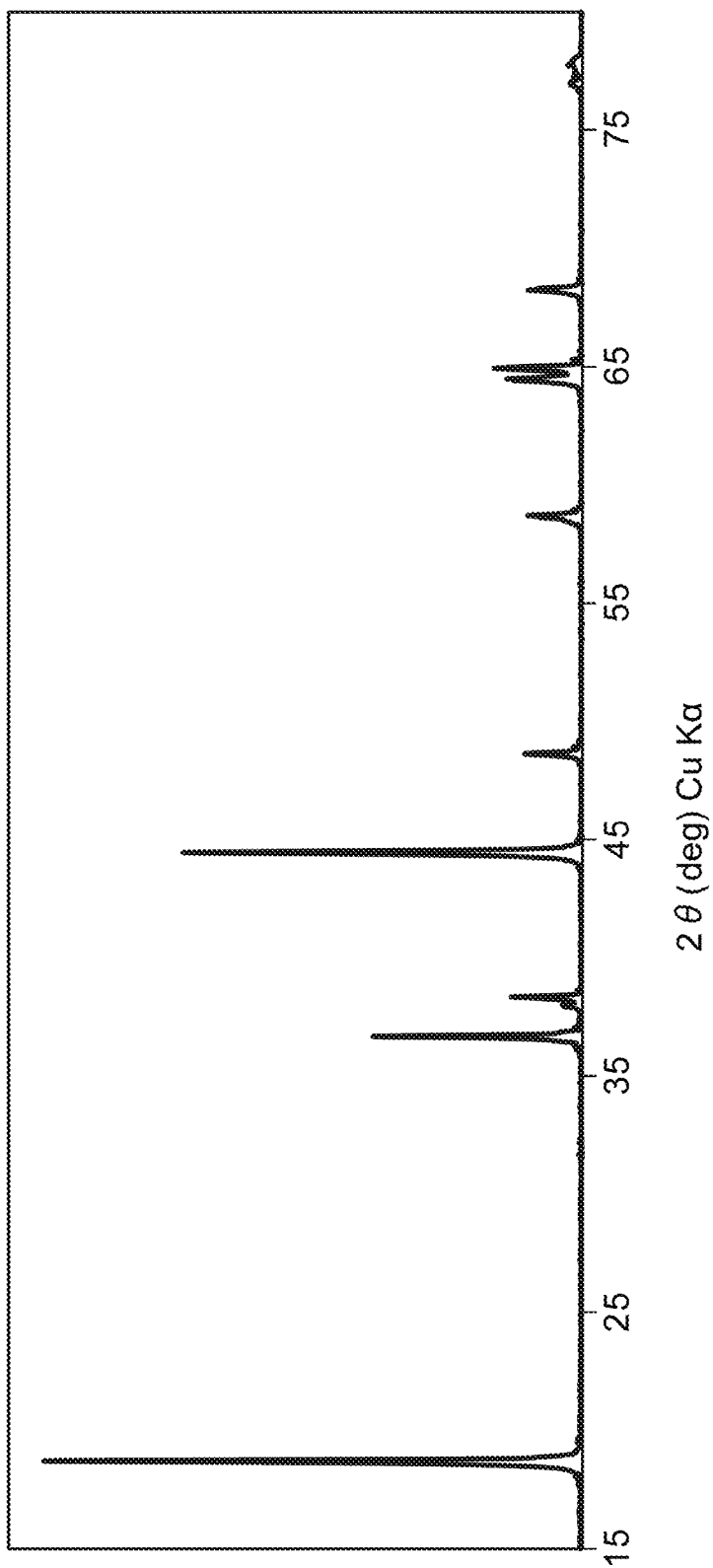
FIG. 5 is a graph showing the XRD spectrum of the positive-electrode material of Example 4.

FIG. 4A is a mapped image of a Ti element in a primary particle of the positive-electrode material of Example 4. The mapped image of the Ti element shown in FIG. 4A was obtained by embedding the positive-electrode material of Example 4 in resin, and then forming the material into a thin piece using a focused ion beam (FIB) and measuring the material with an energy dispersive X-ray spectroscopy (TEM-EDX) using a transmission electron microscope. FIG. 4B is a graph illustrating the distance from the surface of the primary particle of the positive-electrode material shown in FIG. 4A and the composition ratio. The composition ratio shown in FIG. 4B is the composition ratio of each of Ni, Co, Mn, and Ti in a linear composition ratio analysis region A-A shown in FIG. 4A. FIG. 5 is a graph showing the XRD spectrum of the positive-electrode material of Example 4.

As shown in FIGS. 4A and 4B, Ti is not substituted in the entire primary particle of the positive-electrode material, but is concentrated in a region of about 5 nm from the surface of the primary particle. This shows that an agglomerated Ti layer having $Ti^{3+}$ concentrated therein is formed on the surface of each secondary particle having agglomerated primary particles of the lithium complex compound.

In addition, as shown in FIG. 5, a covering layer (different phase) like $LiTiO_2$ was not seen. The positive-electrode material for the lithium ion secondary battery of Example 4 has a, which indicates the amount of excess or deficiency of Li in the composition formula, in the range of 0 to 0.06, has e, which indicates the Ti content, in the range of 0.005 to 0.15, and has a ratio a/e of less than or equal to 5. Accordingly, it is considered that a different phase like a Li—Ti—O compound was not generated.

Next, the lithium ion secondary batteries of Example 1 to Comparative Example 4 were produced in accordance with the following procedures using the positive-electrode materials of Example 1 to Comparative Example 4. First, a positive-electrode material, a binder, and a conductive material were mixed to prepare a positive-electrode mixture slurry. Then, an aluminum foil with a thickness of 20 which is a positive-electrode current collector, was coated with the prepared positive-electrode mixture slurry. Then, the slurry was dried at 120° C. and compression-molded with a press such that the electrode density became 2.7 g/cm³. Then, the molded object was stamped into a disk with a diameter of 15 mm to produce a positive electrode. Then, a negative electrode was produced by using metallic lithium as a negative-electrode material.

Next, a lithium ion secondary battery was produced using the thus produced positive electrode and negative electrode as well as a nonaqueous electrolytic solution. For the nonaqueous electrolytic solution, a solution obtained by dissolving $LiPF_6$ in a solvent, which has been obtained by mixing ethylene carbonate and dimethyl carbonate to attain a volume ratio of 3:7, so that the final concentration became 1.0 mol/L was used.

Next, a charge-discharge test was conducted on each of the produced lithium ion secondary batteries of Example 1 to Comparative Example 4 to measure the initial discharge capacity. Charging was conducted with a charging current of 0.2 CA, and with a constant current and a constant voltage up to a charging termination voltage of 4.3 V, while discharging was conducted with a discharging current of 0.2 CA, and with a constant current up to a discharging termination voltage of 2.5 V. After that, 50 cycles of charging and discharging were repeatedly conducted with a charging and discharging current of 1.0 CA, a charging termination voltage of 4.4 V, and a discharging termination voltage of 2.5 V. The percentage of the discharge capacity measured in the 50-th cycle divided by the discharge capacity measured in the 1st cycle was defined as the capacity retention rate.

Further, regarding Examples 2 and 5 to 8 and Comparative Examples 1 and 3, the resistance increase rate as well as the resistance at −20° C. and a state-of-charge of 10% (10% SOC) was evaluated. For evaluating such values, graphite was used as the negative-electrode material, and graphite, methyl-cellulose sodium, and styrene/butadiene rubber were mixed at a mass ratio of 98:1:1. Then, a current collector of a copper foil with a thickness of 10 µm was coated with the uniformly mixed slurry. After that, the slurry applied to the current collector was dried at 120° C. and compression-molded with a press such that the electrode density became 1.5 g/cm³.

With the negative electrode produced as above, a battery was produced in same manner as that described above. The thus produced battery was charged with a constant current of 0.2 CA, a constant voltage of 4.2 V, and a cut current of 0.05 CA, and was then discharged with a constant current of 0.2 CA and a termination voltage of 2.5 V, so that the obtained discharge capacity was determined as the rated voltage. After that, the battery was charged again with a constant current of 0.2 CA, a constant voltage of 4.2 V, and a cut current of 0.05 CA, so that a voltage at which a 10% charging capacity of the rated capacity was attained was determined as the 10% SOC voltage.

Similarly, 20%, 50%, and 95% SOC voltages of the produced battery were determined. Further, after the produced battery was charged at 50° C. up to 95% SOC, a cycle of discharging the battery by 75% of the rated capacity was repeated 300 times, and the resistance of the battery after it was discharged for 10 seconds at 50% SOC before and after the cycles was measured so that the resistance increase rate before and after the cycles was evaluated. Similarly, after 10% SOC of the battery was attained at 25° C., the resistance of the battery at −20° C. was evaluated.

Table 2A below shows the composition formula, the particle fracture strength, and the specific surface area of each of the positive-electrode materials of Example 1 to Comparative Example 4. In addition, Table 2A also shows the atomic ratio $Ti^{3+}/Ti^{4+}$ between $Ti^{3+}$ and $Ti^{4+}$ of the lithium complex compound that forms the positive-electrode material of each of Examples 1 to 9 and Comparative Examples 2 to 4 and the value a/e of the composition formula of the positive-electrode material.

TABLE 2A

| | Composition Formula $Li_{(1+a)}Ni_bMn_cCo_dTi_eO_{2+\alpha}$ | a/e | $\dfrac{Ti^{3+}}{Ti^{4+}}$ | Particle Fracture Strength (MPa) | Specific Surface Area (m²/g) |
|---|---|---|---|---|---|
| Example 1 | $Li_{1.02}Ni_{0.79}Mn_{0.05}Co_{0.15}Ti_{0.01}O_{2+\alpha}$ | 2 | 1.9 | 51 | 1.30 |
| Example 2 | $Li_{1.02}Ni_{0.79}Mn_{0.05}Co_{0.15}Ti_{0.01}O_{2+\alpha}$ | 2 | 2.8 | 67 | 0.76 |
| Example 3 | $Li_{1.02}Ni_{0.78}Mn_{0.05}Co_{0.15}Ti_{0.02}O_{2+\alpha}$ | 1 | 2.0 | 55 | 1.25 |
| Example 4 | $Li_{1.02}Ni_{0.78}Mn_{0.04}Co_{0.16}Ti_{0.03}O_{2+\alpha}$ | 0.66 | 2.1 | 53 | 1.33 |
| Example 5 | $Li_{1.06}Ni_{0.79}Mn_{0.05}Co_{0.15}Ti_{0.01}O_{2+\alpha}$ | 6 | 1.5 | 45 | 1.29 |
| Example 6 | $Li_{1.00}Ni_{0.79}Mn_{0.05}Co_{0.15}Ti_{0.01}O_{2+\alpha}$ | 0 | 2.9 | 74 | 0.81 |
| Example 7 | $Li_{1.02}Ni_{0.79}Mn_{0.05}Co_{0.15}Ti_{0.01}O_{2+\alpha}$ | 2 | 2.7 | 138 | 0.62 |
| Example 8 | $Li_{1.02}Ni_{0.79}Mn_{0.05}Co_{0.15}Ti_{0.01}O_{2+\alpha}$ | 2 | 1.8 | 83 | 0.85 |
| Example 9 | $Li_{1.02}Ni_{0.79}Mn_{0.05}Co_{0.15}Ti_{0.01}O_{2+\alpha}$ | 2 | 2.9 | 153 | 0.47 |
| Comparative Example 1 | $Li_{1.02}Ni_{0.80}Mn_{0.05}Co_{0.15}O_{2+\alpha}$ | — | — | 109 | 0.86 |
| Comparative Example 2 | $Li_{1.02}Ni_{0.79}Mn_{0.05}Co_{0.15}Ti_{0.01}O_{2+\alpha}$ | 2 | 1.3 | 40 | 2.54 |
| Comparative Example 3 | $Li_{1.02}Ni_{0.79}Mn_{0.05}Co_{0.15}Ti_{0.01}O_{2+\alpha}$ | 2 | 1.4 | 45 | 2.36 |
| Comparative Example 4 | $Li_{1.02}Ni_{0.77}Mn_{0.04}Co_{0.15}Ti_{0.04}O_{2+\alpha}$ | 0.5 | 1.3 | 42 | 1.81 |

Table 2B below shows the 0.2 C initial discharge capacity and the capacity retention rate after 50 cycles of each of the lithium ion secondary batteries of Examples 1 to 9 and Comparative Examples 1 to 4. In addition, Table 2B also shows the resistance increase rate and the 10% SOC resistance ratio at −20° C. of each of the secondary batteries of Examples 2 and 5 to 8 and Comparative Examples 1 and 3.

TABLE 2B

|  | Composition Formula $Li_{(1+a)}Ni_bMn_cCo_dTi_eO_{2+\alpha}$ | 0.2 C Discharge Capacity (Ah/kg) | Capacity Retention Rate 50 Cycles (%) | Resistance Increase Rate (%) | 10% SOC Resistance Ratio at −20° C. |
|---|---|---|---|---|---|
| Example 1 | $Li_{1.02}Ni_{0.79}Mn_{0.05}Co_{0.15}Ti_{0.01}O_{2+\alpha}$ | 210 | 90.9 | — | — |
| Example 2 | $Li_{1.02}Ni_{0.79}Mn_{0.05}Co_{0.15}Ti_{0.01}O_{2+\alpha}$ | 190 | 92.9 | 53 | 0.73 |
| Example 3 | $Li_{1.02}Ni_{0.78}Mn_{0.05}Co_{0.15}Ti_{0.02}O_{2+\alpha}$ | 192 | 91.8 | — | — |
| Example 4 | $Li_{1.02}Ni_{0.78}Mn_{0.04}Co_{0.15}Ti_{0.03}O_{2+\alpha}$ | 193 | 92.1 | — | — |
| Example 5 | $Li_{1.06}Ni_{0.79}Mn_{0.05}Co_{0.15}Ti_{0.01}O_{2+\alpha}$ | 195 | 90.0 | 85 | 0.85 |
| Example 6 | $Li_{1.00}Ni_{0.79}Mn_{0.05}Co_{0.15}Ti_{0.01}O_{2+\alpha}$ | 188 | 92.0 | 68 | 0.75 |
| Example 7 | $Li_{1.02}Ni_{0.79}Mn_{0.05}Co_{0.15}Ti_{0.01}O_{2+\alpha}$ | 189 | 93.1 | 26 | 0.66 |
| Example 8 | $Li_{1.02}Ni_{0.79}Mn_{0.05}Co_{0.15}Ti_{0.01}O_{2+\alpha}$ | 183 | 90.2 | 63 | 0.80 |
| Example 9 | $Li_{1.02}Ni_{0.79}Mn_{0.05}Co_{0.15}Ti_{0.01}O_{2+\alpha}$ | 183 | 92.0 | — | — |
| Comparative Example 1 | $Li_{1.02}Ni_{0.80}Mn_{0.05}Co_{0.15}O_{2+\alpha}$ | 193 | 89.8 | 128 | 1 |
| Comparative Example 2 | $Li_{1.02}Ni_{0.79}Mn_{0.05}Co_{0.15}Ti_{0.01}O_{2+\alpha}$ | 183 | 86.5 | — | — |
| Comparative Example 3 | $Li_{1.02}Ni_{0.79}Mn_{0.05}Co_{0.15}Ti_{0.01}O_{2+\alpha}$ | 178 | 87.4 | 156 | 0.92 |
| Comparative Example 4 | $Li_{1.02}Ni_{0.77}Mn_{0.04}Co_{0.15}Ti_{0.04}O_{2+\alpha}$ | 175 | 88.3 | — | — |

It is found that the capacity retention rate of each of the lithium ion secondary batteries of Examples 1 to 9 with Ti added thereto is over 90%, which is higher than the capacity retention rate of the lithium ion secondary battery of Comparative Example 1 without Ti added thereto. That is, with the addition of Ti, it is possible to suppress generation of a different phase in the grain boundaries of the particles of the positive-electrode material and thus improve the particle fracture strength as described below, and also suppress generation of Ni oxide (NiO-like different phase) on the surfaces of the particles and thus suppress the resistance increase rate. Consequently, it was confirmed that the cycle characteristics of the positive-electrode material were improved. Meanwhile, it was also confirmed that since each of the lithium ion secondary batteries of Comparative Examples 2 to 4 has a low capacity retention rate and a low 0.2 C initial discharge capacity, only the addition of Ti is not sufficient, but the battery performance can be effectively improved by performing firing at an appropriate temperature and setting the atomic ratio $Ti^{3+}/Ti^{4+}$ to greater than or equal to 1.5.

Figure 6:
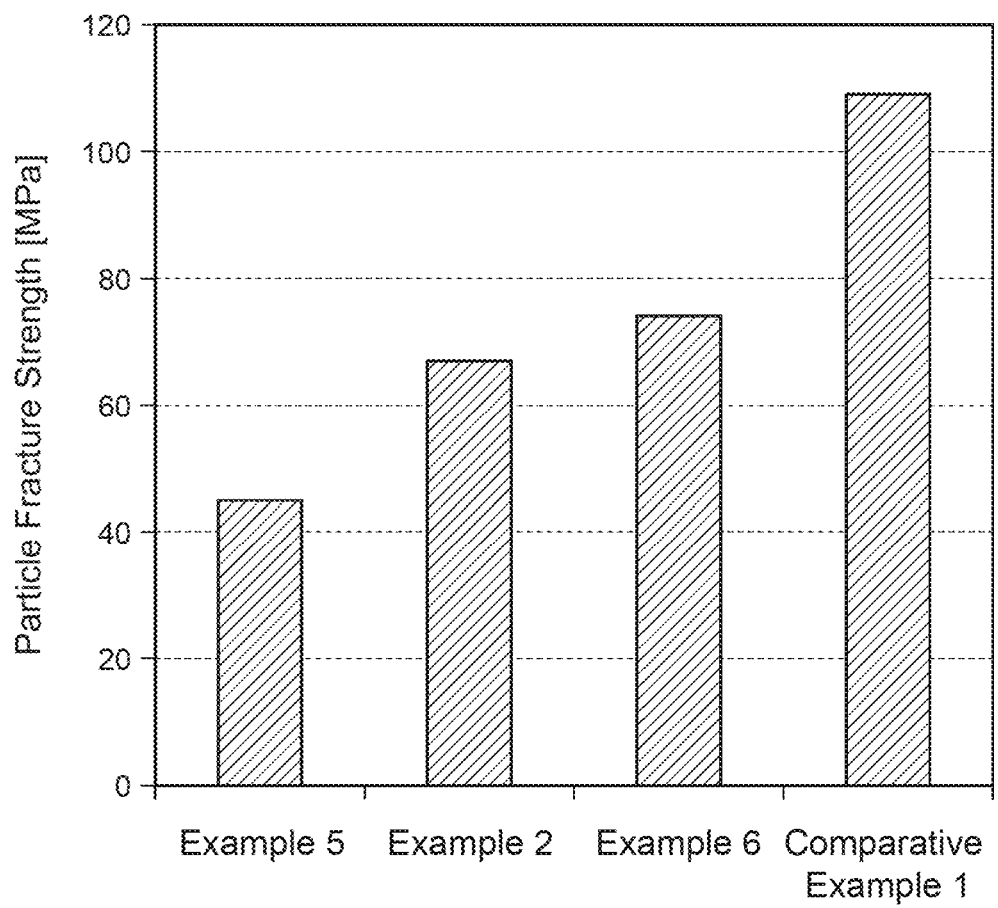
FIG. 6 is a graph showing the particle fracture strength of each of positive-electrode materials of Examples and Comparative Examples.

FIG. 6 is a graph showing the particle fracture strength of each of the positive-electrode materials of Examples 2, 5, and 6 and Comparative Example 1. The particle fracture strength of each of Examples 2, 5 and 6 is lower than that of Comparative Example 1 without Ti added thereto. That is, when Ti is added, the particle fracture strength of the positive-electrode material becomes lower than that when Ti is not added.

However, regarding Example 2 having a higher atomic ratio $Ti^{3+}/Ti^{4+}$ than that of Example 5, the particle fracture strength of the positive-electrode material is improved than that of Example 5. Further, regarding Example 6 having a higher atomic ratio $Ti^{3+}/Ti^{4+}$ than that of Example 2, the particle fracture strength of the positive-electrode material is further improved than that of Example 2. That is, it was confirmed that as long as the atomic ratio $Ti^{3+}/Ti^{4+}$ is in the range of 1.5 to 20, a sufficient particle fracture strength can be maintained even if Ti is added.

It was also confirmed that regarding Example 2 having high $Ti^{3+}/Ti^{4+}$ and a high particle fracture strength, the resistance increase rate is significantly reduced than that of Comparative Example 1 without Ti added thereto, and regarding the resistance increase rate also, the effect of improving the cycle characteristics is obtained.

Figure 7:
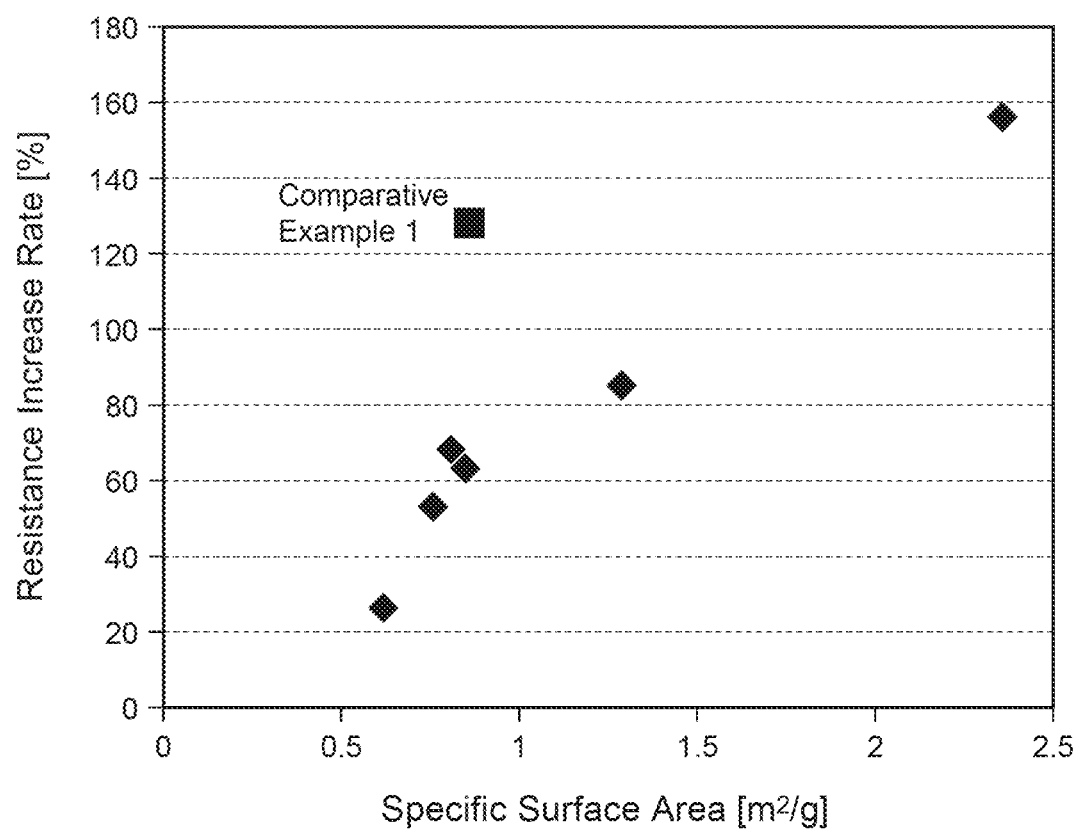
FIG. 7 is a graph showing the relationship between the resistance increase rate of each secondary battery and the specific surface area of each positive-electrode material.

FIG. 7 is a graph showing the relationship between the resistance increase rate of each of the secondary batteries of Examples 2 and 5 to 8 and Comparative Examples 1 and 3 and the specific surface area of each positive-electrode material. Regarding the secondary batteries other than the secondary battery of Comparative Example 1 in which a positive-electrode material without Ti added thereto was used, it was confirmed that the resistance increase rate can be effectively suppressed as long as the BET specific surface area of the positive-electrode material is in the range of 0.2 m$^2$/g to 2.0 m$^2$/g.

In addition, regarding Example 9 having a specific surface area as small as 0.47 m$^2$/g, the 0.2 C discharge capacity is 183 Ah/Kg, which is lower than those of the other Examples. Thus, it is found that in order to obtain a high capacity, the specific surface area is desirably greater than or equal to 0.5 m$^2$/g.

Regarding Example 5 having a high Li composition ratio, $Ti^{3+}/Ti^{4+}$ is lower than that of Example 2, and the particle strength is lower and the resistance increase rate is higher. This is considered to be due to the reason that generation of a different phase like $Li_2TiO_3$ has been promoted.

In addition, regarding Example 7 in which $TiO_2$ was used as the Ti raw material and the particle strength is high, the resistance increase rate is further lower than that of Example 5. However, regarding Example 8 in which $TiO_2$ was similarly used as the Ti raw material, grinding was not performed sufficiently. Therefore, $Ti^{3+}/Ti^{4+}$ is low and the resistance increase rate is higher than that of Example 7.

Further, at a low temperature where the proportion of the resistance of the positive electrode is high, specifically, at −20° C. that is a low SOC condition, the 10% SOC resistance of each of Examples 2 and 5 to 8, in particular, is significantly lower than those of Comparative Examples 1 and 3. It was confirmed that regarding a positive-electrode material with high $Ti^{3+}/Ti^{4+}$, reactions at the positive electrode are not inhibited, and rather, the resistance becomes low at low SOC.

Figure 8A:
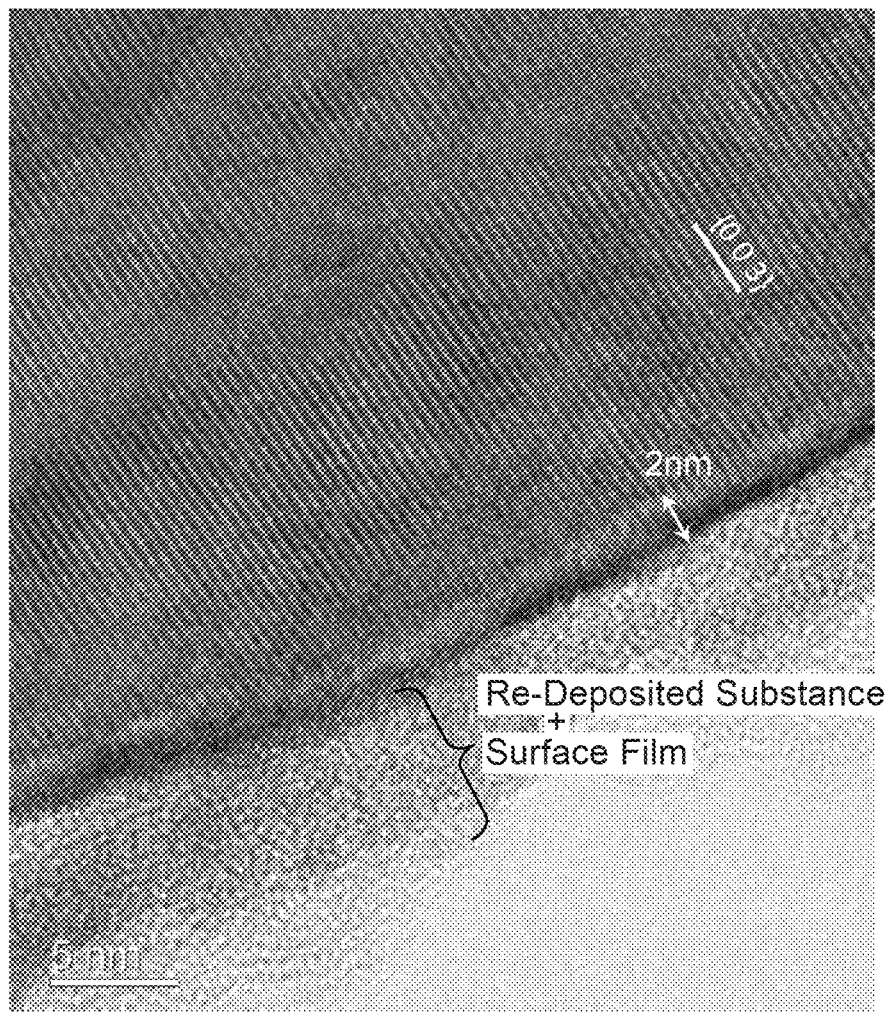
FIG. 8A is a photograph of a cross-section of an area around the surface of a particle of a positive-electrode material of Example 2 after 300 cycles.

FIG. 8A is a microscope photograph of a cross-section of an area around the surface of a particle of the positive-electrode material for the lithium ion secondary battery of Example 2 after 300 cycles. The positive-electrode material for the lithium ion secondary battery of Example 2 has a, which indicates the amount of excess or deficiency of Li in the composition formula, in the range of 0 to 0.06, and has e, which indicates the Ti content, in the range of 0.005 to 0.15. When Ti is contained in a lithium complex compound that is a positive-electrode material, the thickness of a layer of a NiO-like different phase is suppressed to about 2 nm. It should be noted that the outermost surface of each particle of the positive-electrode material has formed thereon a layer of a re-deposited substance and a surface film.

Figure 8B:
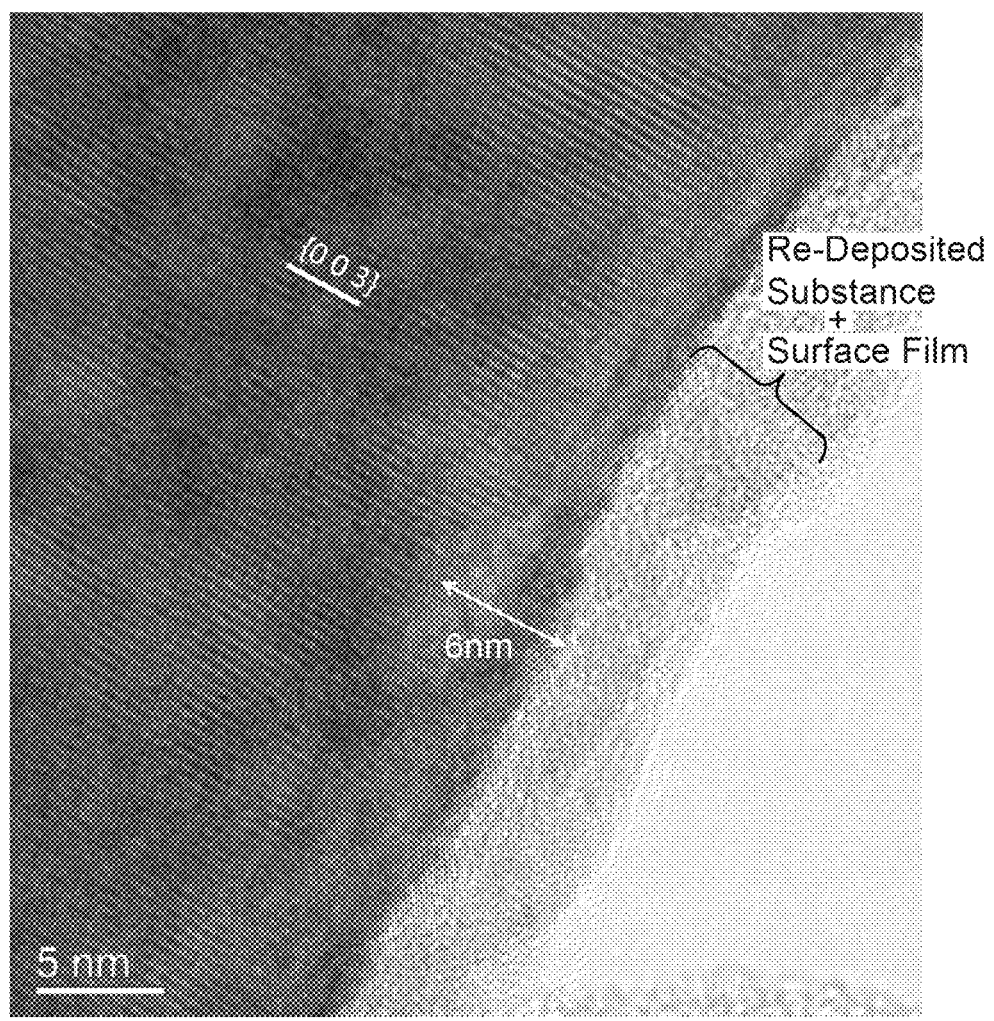
FIG. 8B is a photograph of a cross-section of an area around the surface of a particle of a positive-electrode material of Comparative Example 1 after 300 cycles.

FIG. 8B is a microscope photograph of a cross-section of an area around the surface a particle of the positive-electrode material for the lithium ion secondary battery of Comparative Example 1 after 300 cycles. The positive-electrode material for the lithium ion secondary battery of Comparative Example 1 has a, which indicates the amount of excess or deficiency of Li in the composition formula, in the range of 0 to 0.06, but does not contain Ti. Therefore, a layer of a NiO-like different phase is formed to a thickness of about 6 nm, which means that a different phase is more likely to be generated than when Ti is added. It should be noted that the outermost surface of each particle of the positive-electrode material also has formed thereon a layer of a re-deposited substance and a surface film.

Regarding the positive-electrode materials used for the secondary batteries of Example 2 and Comparative Example 1, the film thickness of the NiO-like different phase generated before or after the cycles was evaluated using electron energy loss spectroscopy (TEM-EELS).

Figure 9A:
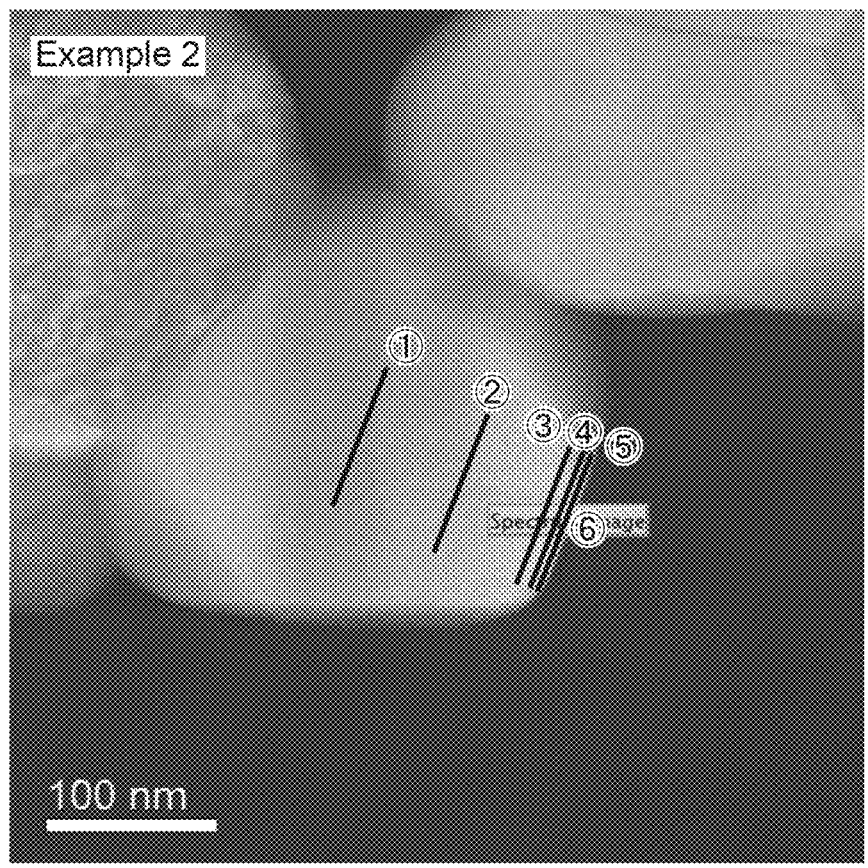
FIG. 9A is a photograph of a cross-section of the positive-electrode material of the secondary battery of Example 2 after 0 cycle.
Figure 9B:
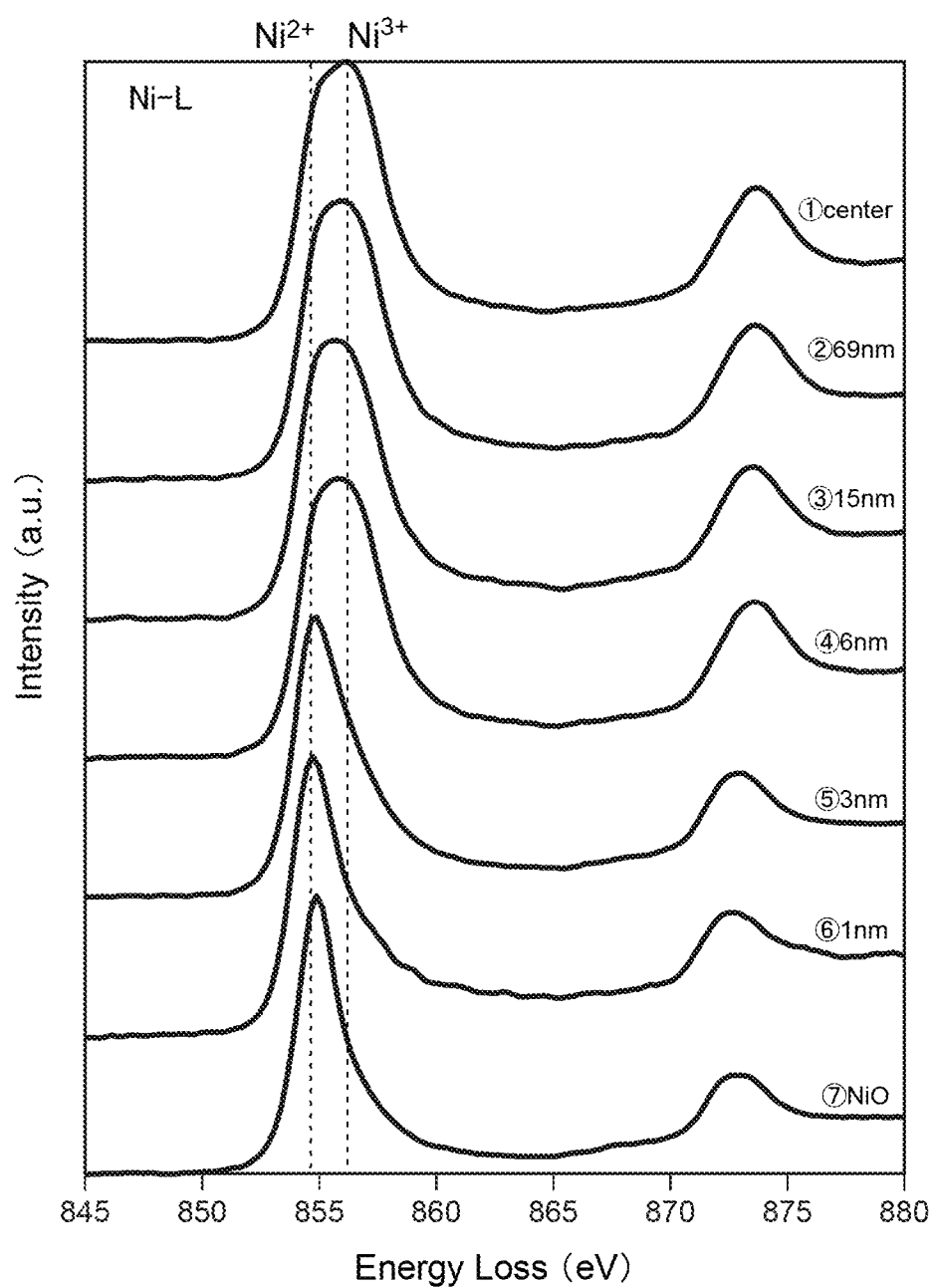
FIG. 9B shows the measurement result of TEM-EELS at each distance from the surface of the positive-electrode material in FIG. 9A.
Figure 9C:
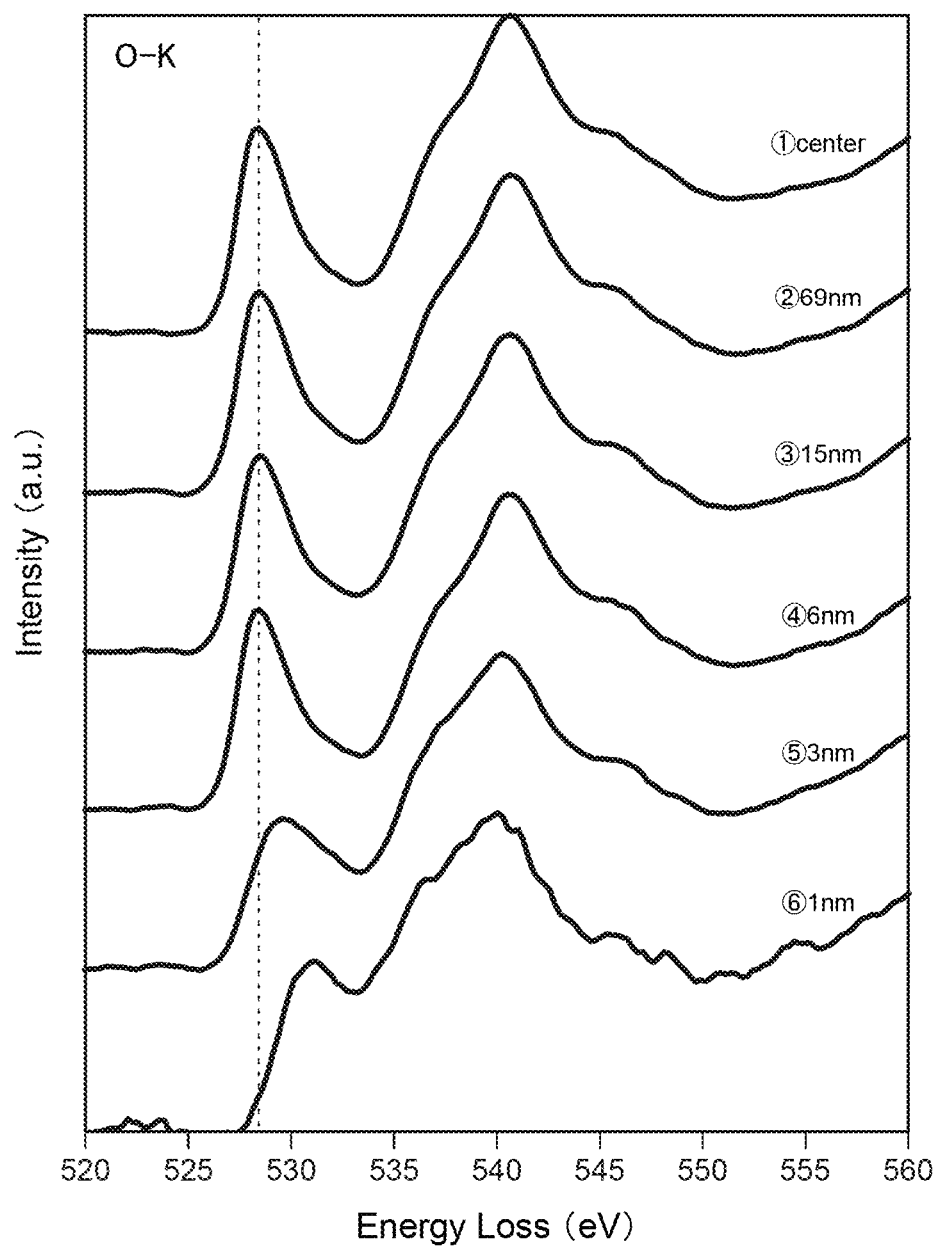
FIG. 9C shows the measurement result of TEM-EELS at each distance from the surface of the positive-electrode material in FIG. 9A.

FIG. 9A is a microscope photograph of a cross-section of the positive-electrode material for the secondary battery of Example 2 after 0 cycle. FIGS. 9B and 9C show the results of measuring Ni and O through electron energy loss spectroscopy (TEM-EELS) at each distance from the surface of the positive-electrode material shown in FIG. 9A (first to sixth distances; seventh distance indicates NiO as a reference sample).

Figure 10A:
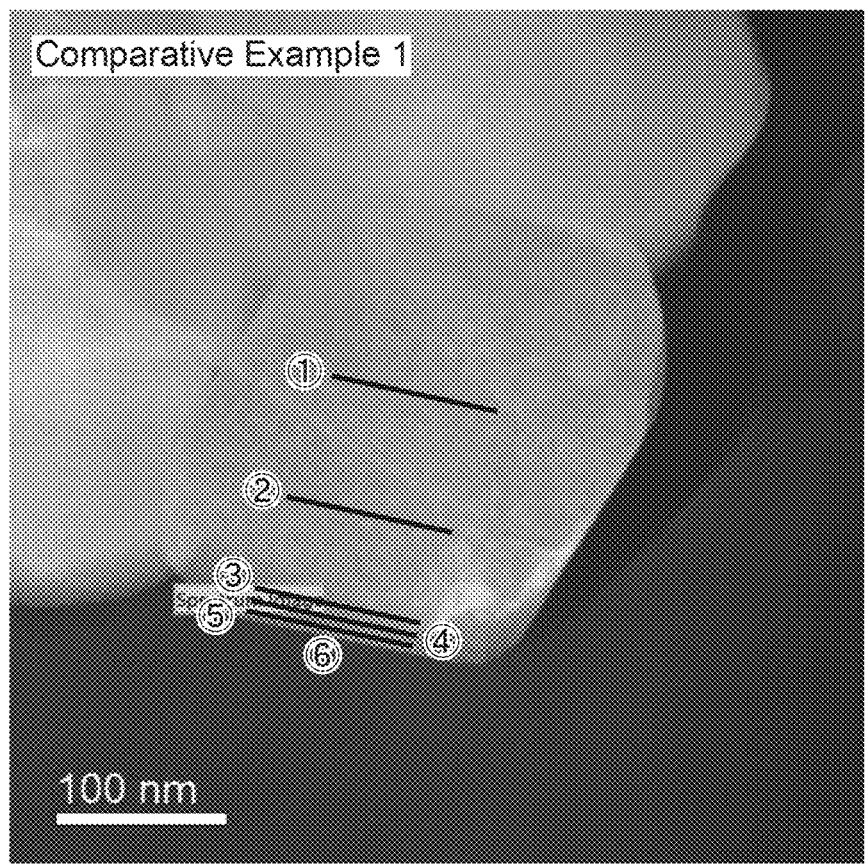
FIG. 10A is a photograph of a cross-section of the positive-electrode material for the secondary battery of Comparative Example 1 after 0 cycle.
Figure 10B:
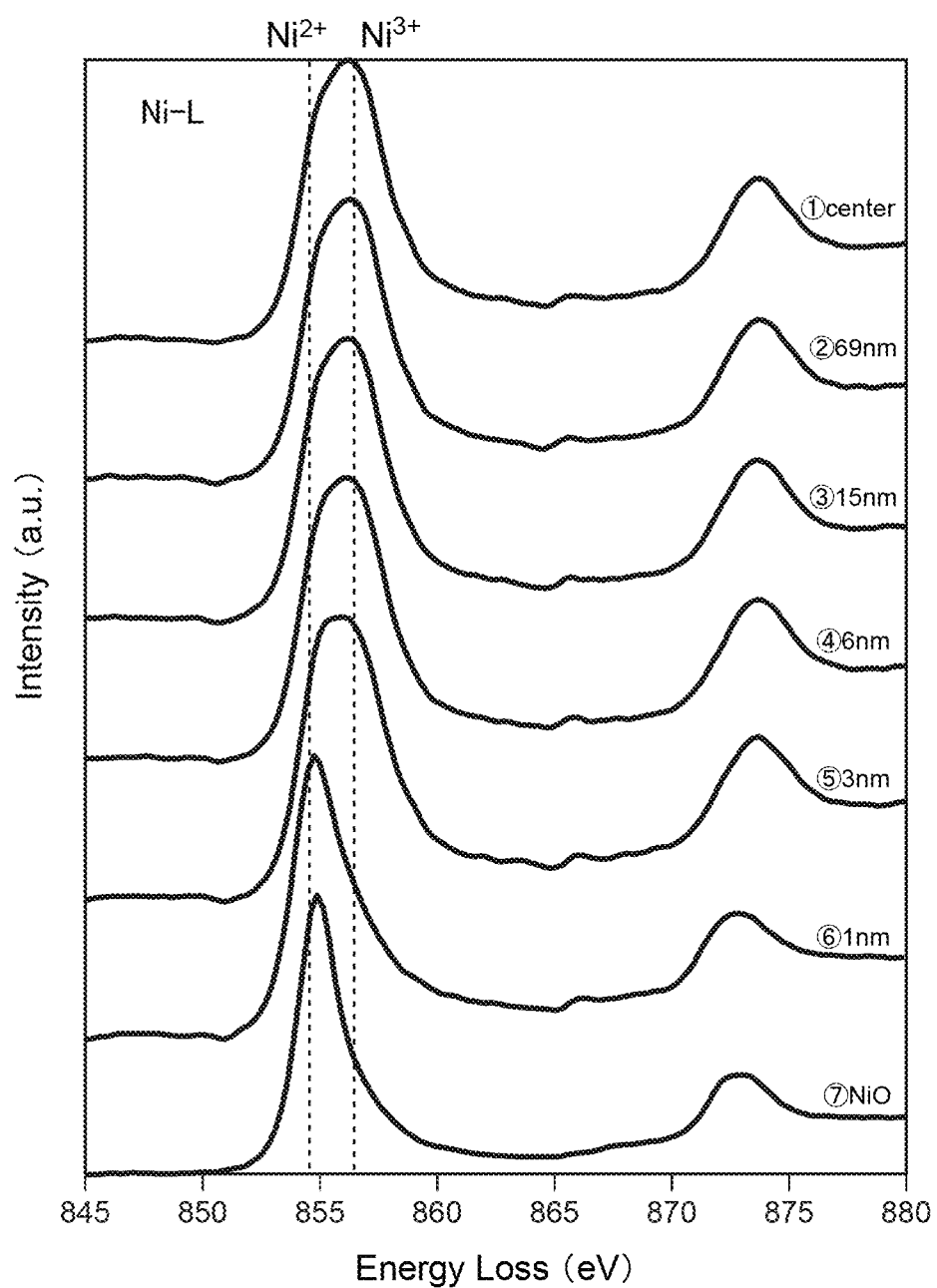
FIG. 10B shows the measurement result of TEM-EELS at each distance from the surface of the positive-electrode material in FIG. 10A.
Figure 10C:
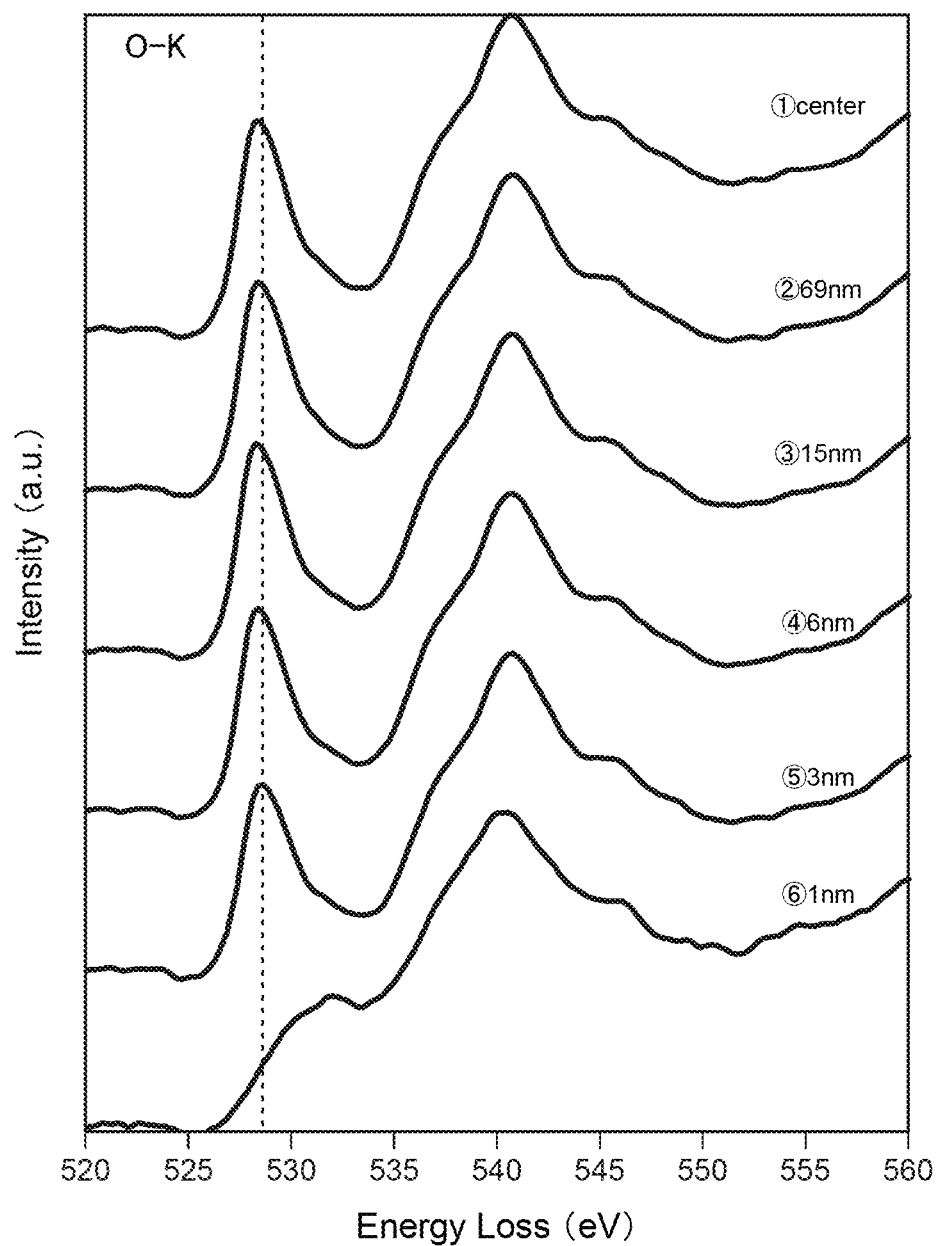
FIG. 10C shows the measurement result of TEM-EELS at each distance from the surface of the positive-electrode material in FIG. 10A.

Meanwhile, FIG. 10A is a microscope photograph of a cross-section of the positive-electrode material for the secondary battery of Comparative Example 1 after 0 cycle. FIGS. 10B and 10C show the measurement results of TEM-EELS at each distance from the surface of the positive-electrode material shown in FIG. 10A (first to sixth distances; seventh distance indicates NiO on the surface).

Figure 11A:
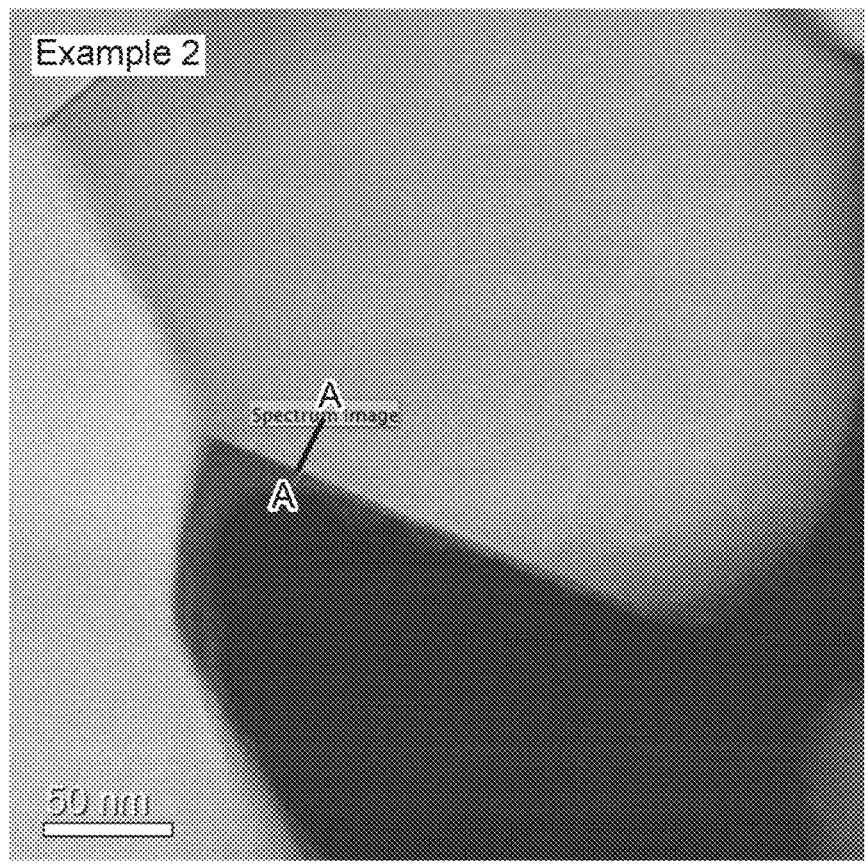
FIG. 11A is a photograph of a cross-section of the positive-electrode material of the secondary battery of Example 2 after 300 cycles.
Figure 11B:
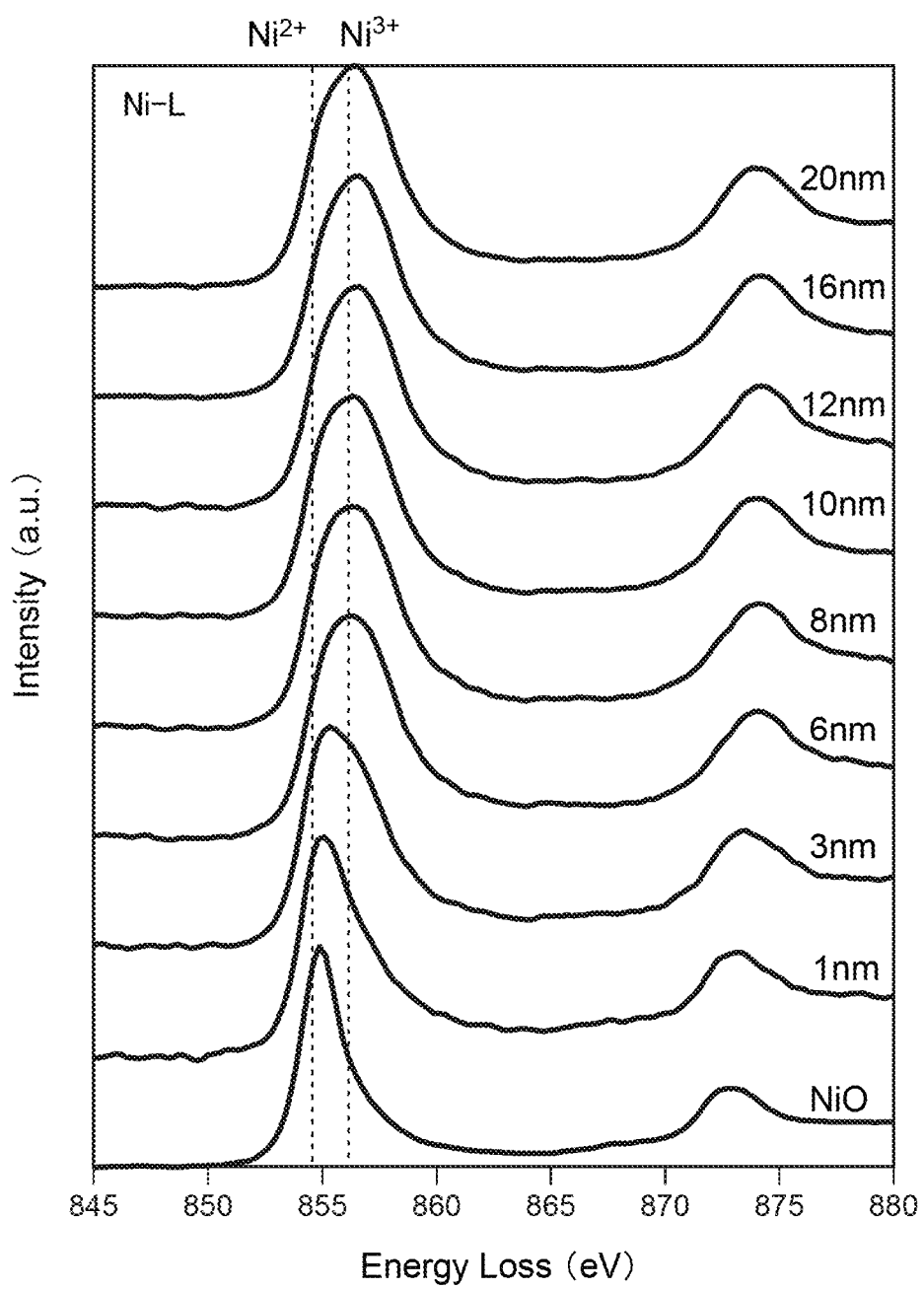
FIG. 11B shows the measurement result of TEM-EELS at each distance from the surface of the positive-electrode material in FIG. 11A.
Figure 11C:
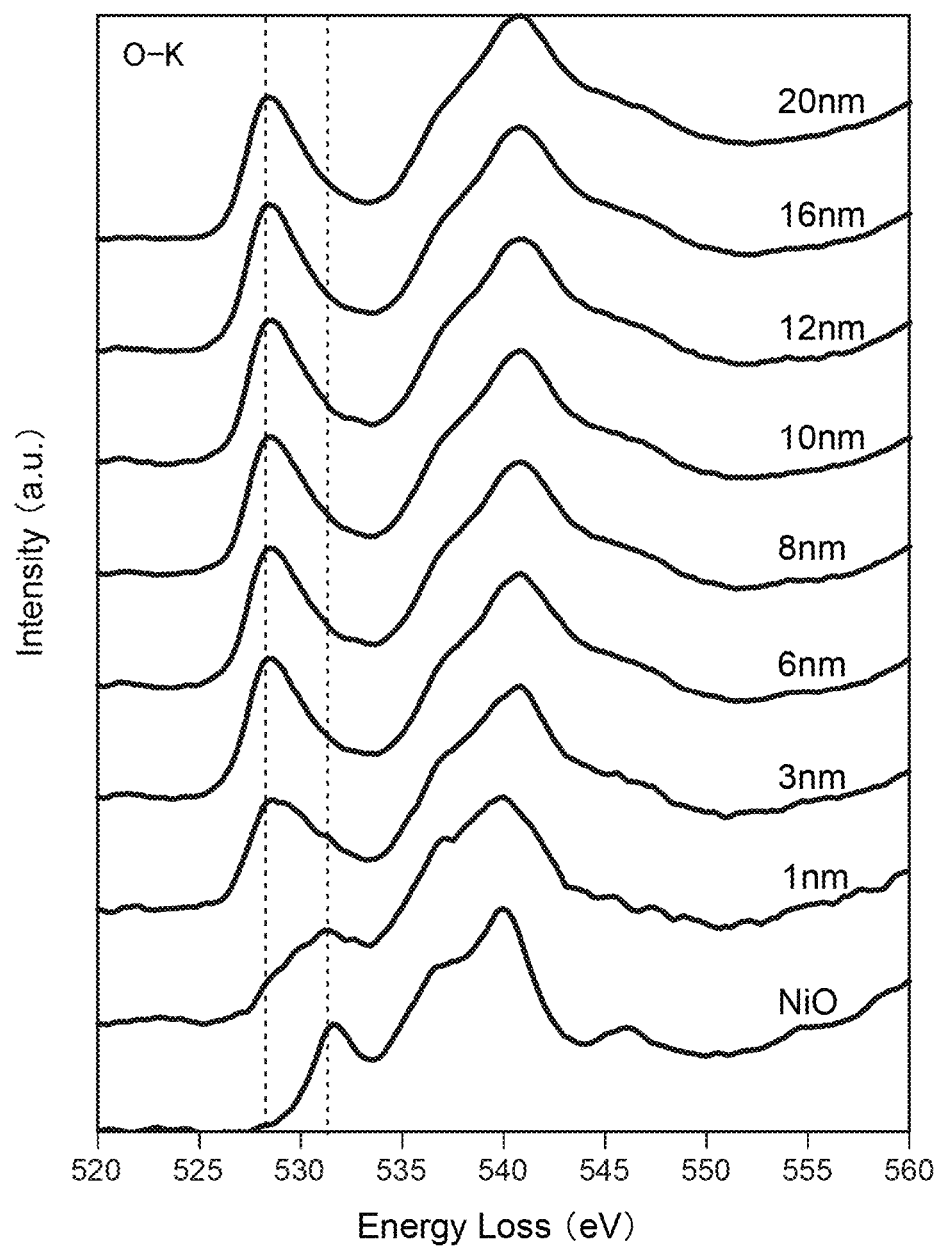
FIG. 11C shows the measurement result of TEM-EELS at each distance from the surface of the positive-electrode material in FIG. 11A.

FIG. 11A is a microscope photograph of a cross-section of the positive-electrode material for the secondary battery of Example 2 after 300 cycles. FIGS. 11B and 11C show the results of measuring an area around the surface of the positive-electrode material along A-A shown in FIG. 11A through TEM-EELS.

Figure 12A:
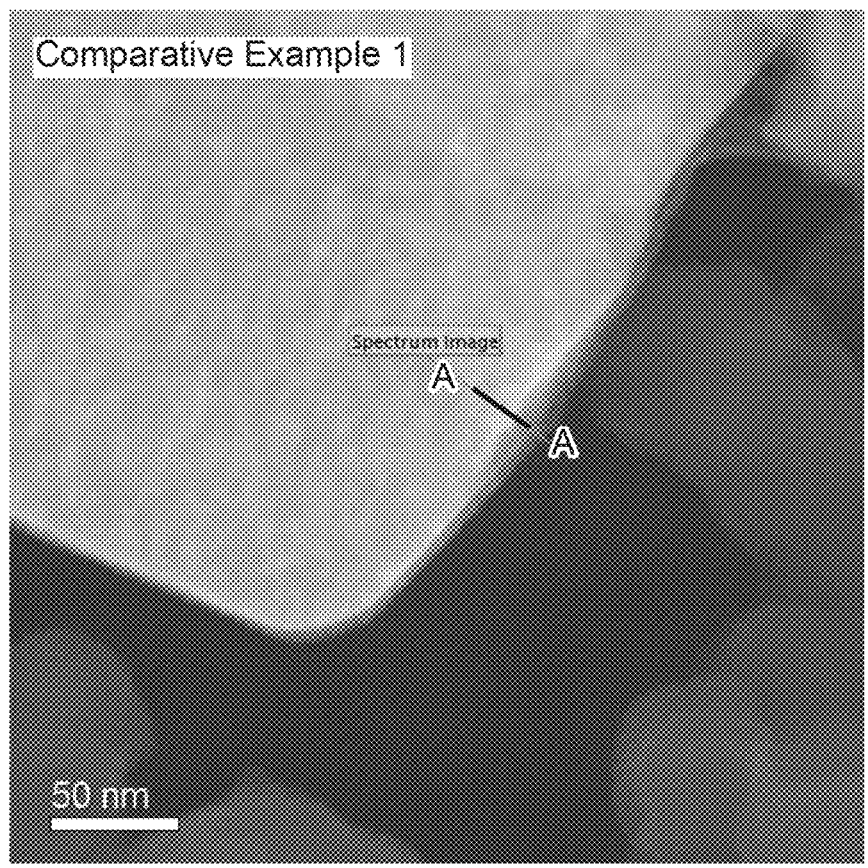
FIG. 12A is a photograph of a cross-section of the positive-electrode material of the secondary battery of Comparative Example 1 after 300 cycles.
Figure 12B:
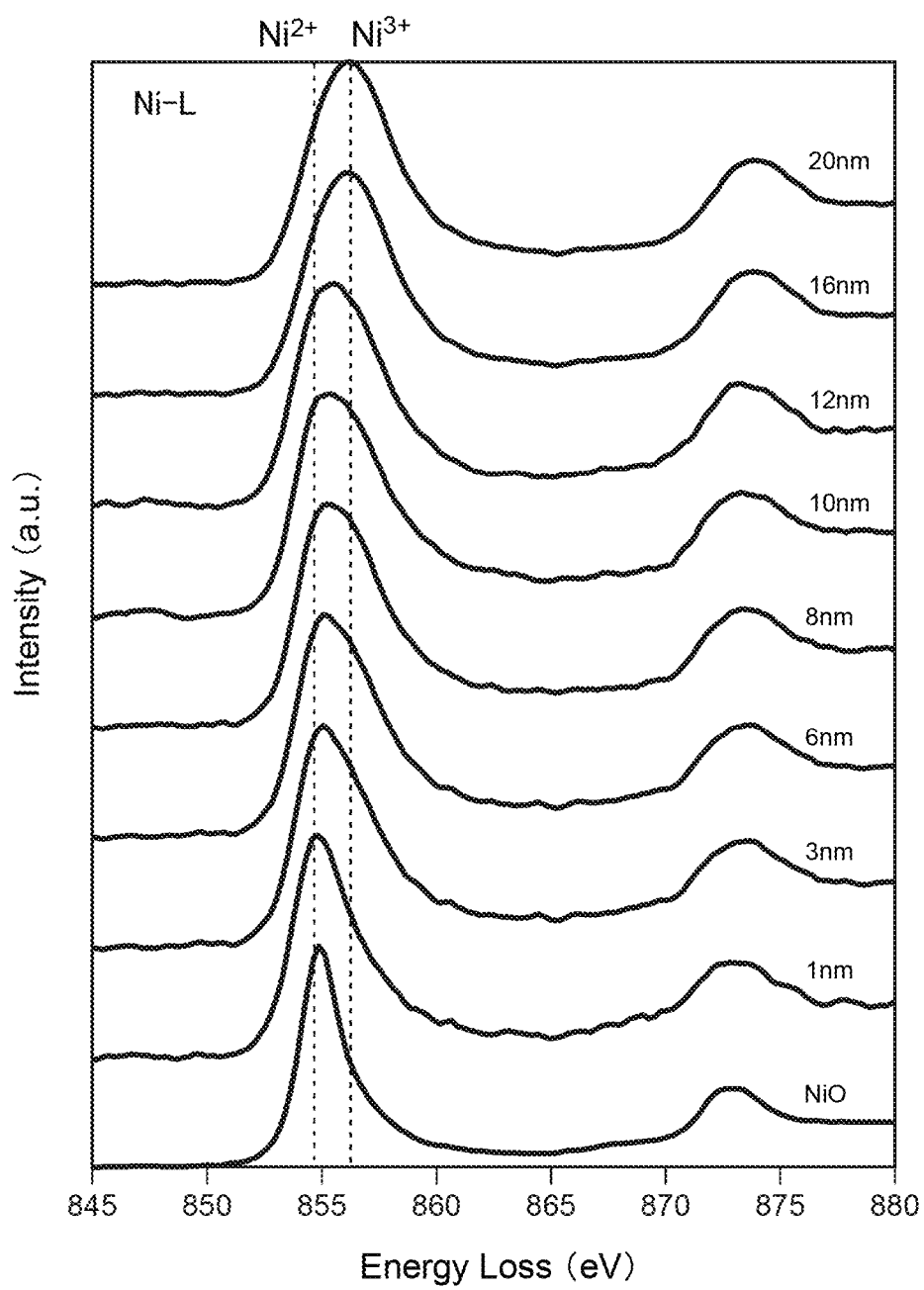
FIG. 12B shows the measurement result of TEM-EELS at each distance from the surface of the positive-electrode material in FIG. 12A.
Figure 12C:
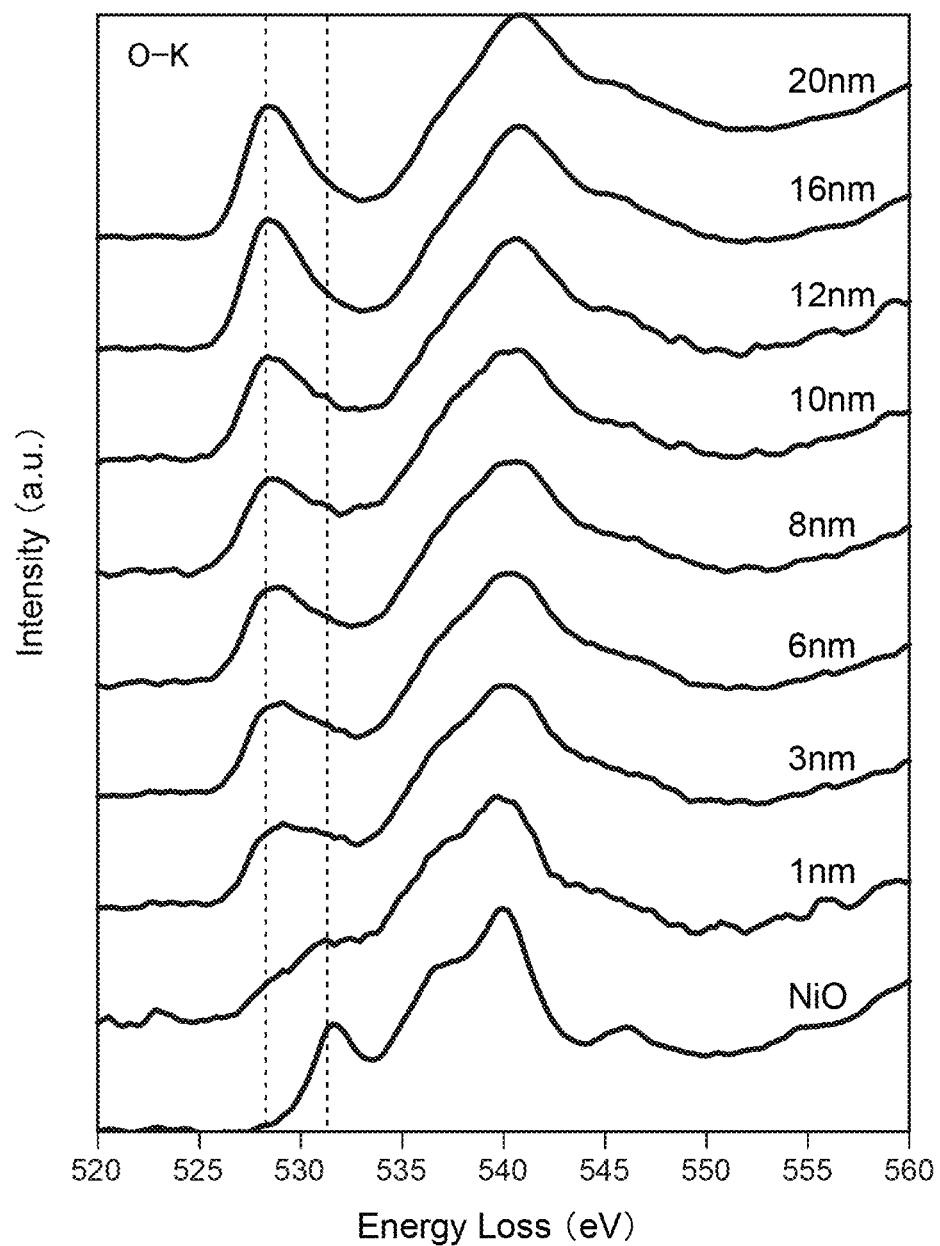
FIG. 12C shows the measurement result of TEM-EELS at each distance from the surface of the positive-electrode material in FIG. 12A.

Meanwhile, FIG. 12A is a microscope photograph of a cross-section of the positive-electrode material for the secondary battery of Comparative Example 1 after 300 cycles. FIGS. 12B and 12C show the results of measuring an area around the surface of the positive-electrode material along A-A shown in FIG. 12A through TEM-EELS.

A peak derived from $Ni^{2+}$ was observed in the range of about 3 nm from the surface of the positive-electrode material for the secondary battery of Example 2 after 0 cycle (FIG. 9B). The spectrum of 0 (FIG. 9C) also indicates that at a distance of up to 3 nm from the surface, a spectral shape differs from that of the inside of the particle, and a different phase thus appears in the range of 3 nm from the surface layer. From the results, it is found that the positive-electrode material for the secondary battery of Example 2 after 0 cycle has a NiO-like different phase generated in the range of about 3 nm from the surface. Regarding the positive-electrode material used for the secondary battery of Example 2, a peak derived from $Ni^{2+}$ was observed in the range of about 3 nm from the surface even after 300 cycles (FIGS. 11B and 11C). From the results, it is found that the positive-electrode material used for the secondary battery of Example 2 undergoes no change in the thickness of the NiO-like different phase before and after the cycles.

Meanwhile, regarding the positive-electrode material for the secondary battery of Comparative Example 1 after 0 cycle, a peak derived from $Ni^{2+}$ was observed in the range of about 1 nm from the surface (FIGS. 10B and 10C). After 300 cycles, a peak derived from $Ni^{2+}$ was observed in the range of about 6 nm from the surface (FIGS. 12B and 12C). From the results, it is found that the positive-electrode material used for the secondary battery of Comparative Example 1 has an increased thickness of the NiO-like different phase after 300 cycles.

The aforementioned results can confirm that adding Ti to a lithium complex compound can suppress generation of a NiO-like different phase after the cycles. Accordingly, it is estimated in Example 2 that the resistance increase rate is suppressed and the cycle characteristics are improved. It was also confirmed that the same holds true for the other Examples.

Example 10

The positive-electrode material of Example 2 was subjected to surface treatment in accordance with the following procedures. First, lithium hexafluorophosphate ($LiPF_6$) and borate ester represented by triisopropoxyboroxin ($(BO)_3(O(CH)(CH_3)_2)_3$) were dissolved in dimethyl carbonate (DMC). Then, a positive-electrode active material was put into and immersed in such organic solvent, which was then stirred for 2 hours. At this time, the amount of borate ester was adjusted such that it became 1 mass % relative to the positive-electrode active material. After that, a powder obtained by suction-filtrating DMC was washed with DMC three times. The washed powder was then dried in a vacuum at 120° C. for 1 hour, whereby the positive-electrode material of Example 10 was obtained.

The surfaces of the positive-electrode material of Example 2 and the positive-electrode material of Example 10 shown in Tables 2A and 2B were analyzed through X-ray photoelectron spectroscopy (XPS). Regarding a binding spectrum of a Ni-2p2/3 that is the main component of the transition metal, Table 3 shows the results of performing fitting analysis of three components including a spectrum with a binding energy of 855.7±0.5 eV derived from Ni—O, a spectrum with a binding energy of 857.4±0.5 eV derived from Ni—F, and a spectrum with a binding energy of 862±0.5 eV that is the average of the satellite peaks of the two components. Table 3 also shows the area ratio of each spectrum to the total sum of Ni—O and Ni—F. It should be noted that the satellite peaks were not taken into consideration for the area ratio of the total sum of Ni because they are "satellite."

TABLE 3

| | Component | Binding Energy (eV) | FWHM | Area Ratio (%) |
|---|---|---|---|---|
| Example 2 | Ni—O | 855.9 | 2.707 | 86.3 |
| | Ni—F | 857.9 | 2.432 | 13.7 |
| | Satellite | 861.9 | 3.880 | — |
| Example 10 | Ni—O | 855.5 | 2.658 | 76.0 |
| | Ni—F | 857.1 | 3.160 | 24.0 |
| | Satellite | 861.6 | 3.758 | — |

The area ratio of Ni—F of Example 2 is 13.7%, while the area ratio of Ni—F of Example 10 is 24.0%. That is, the area ratio of Ni—F of Example 10 is increased than that of Example 2 that has not been subjected to surface treatment.

The results can confirm that the surface of the positive-electrode material used in Example 10 is fluorinated.

Next, the lithium ion secondary battery of Example 10 was produced in the same manner as the lithium ion secondary battery of Example 1 using the positive-electrode material of Example 10, and then, the 0.2C discharge capacity, the capacity retention rate, the resistance increase rate, and the 10% SOC resistance ratio were measured. Table 4 below shows the measurement results of the lithium secondary battery of Example 10 together with the measurement results of the lithium ion secondary battery of Example 2.

TABLE 4

|  | 0.2 C Discharge Capacity (Ah/kg) | Capacity Retention Rate 50 Cycles (%) | Resistance Increase Rate (%) | 10% SOC Resistance Ratio at −20° C. |
|---|---|---|---|---|
| Example 2 | 190 | 92.9 | 53 | 0.73 |
| Example 10 | 188 | 93.3 | 27 | 0.64 |

The resistance increase rate of the secondary battery of Example 2 is 53%, while the resistance increase rate of the secondary battery of Example 10 is 27%. That is, it was confirmed that applying surface treatment to the positive-electrode material by immersing it in an organic solvent containing dissolved therein a boroxine compound represented by Formula $(BO)_3(OR)_3$ and fluoride can fluorinate the surfaces of the secondary particles and can further suppress the resistance increase rate.

REFERENCE SIGNS LIST

100 Lithium ion secondary battery
S1 Mixing step
S2 Firing step
S3 Immersing step

The invention claimed is:

1. A method for producing a positive-electrode material for a lithium ion secondary battery, comprising:
   a mixing step of mixing a lithium-containing compound with compounds each containing a metal element other than Li in the following Formula (1), thereby obtaining a mixture; and
   firing the mixture under an oxidizing atmosphere to obtain a lithium complex compound, the lithium complex compound being represented by the following Formula (1) and having an atomic ratio $Ti^{3+}/Ti^{4+}$ between $Ti^{3+}$ and $Ti^{4+}$, as determined through X-ray photoelectron spectroscopy, of greater than or equal to 1.5 and less than or equal to 20, wherein
   the compounds each containing a metal other than Li in the mixing step comprise an organic titanium compound as a Ti-containing compound:

$$Li_{1+a}Ni_bMn_cCo_dTi_eM_fO_{2+\alpha} \quad (1),$$

where in the Formula (1), M is at least one element selected from the group consisting of Mg, Al, Zr, Mo, and Nb, and a, b, c, d, e, f, and α are numbers satisfying −0.1≤a≤0.2, 0.7<b≤0.9, 0≤c<0.3, 0≤d<0.3, 0<e≤0.25, 0≤f<0.3, b+c+d+e+f=1, and −0.2≤α≤0.2.

2. The method for producing a positive-electrode material for a lithium ion secondary battery according to claim 1, wherein the organic titanium compound is a titanium-containing chelating agent.

3. A method for producing a positive-electrode material for a lithium ion secondary battery, comprising:
   a mixing step of mixing a lithium-containing compound with compounds each containing a metal element other than Li in the following Formula (1), thereby obtaining a mixture; and
   firing the mixture under an oxidizing atmosphere to obtain a lithium complex compound, the lithium complex compound being represented by the following Formula (1) and having an atomic ratio $Ti^{3+}/Ti^{4+}$ between $Ti^{3+}$ and $Ti^{4+}$, as determined through X-ray photoelectron spectroscopy, of greater than or equal to 1.5 and less than or equal to 20, wherein
   the compounds each containing a metal other than Li in the mixing step comprise titanium oxide as a Ti-containing compound:

$$Li_{1+a}Ni_bMn_cCo_dTi_eM_fO_{2+\alpha} \quad (1),$$

where in the Formula (1), M is at least one element selected from the group consisting of Mg, Al, Zr, Mo, and Nb, and a, b, c, d, e, f, and α are numbers satisfying −0.1≤a≤0.2, 0.7<b≤0.9, 0≤c<0.3, 0≤d<0.3, 0<e≤0.25, 0≤f<0.3, b+c+d+e+f=1, and −0.2≤α≤0.2.

* * * * *